US012749440B2

(12) United States Patent

Lee et al.

(10) Patent No.: US 12,749,440 B2
(45) Date of Patent: Sep. 29, 2026

(54) PIXEL, DISPLAY DEVICE INCLUDING THE SAME AND ELECTRONIC DEVICE INCLUDING DISPLAY DEVICE

(71) Applicants: Samsung Display Co., LTD., Yongin-si (KR); SEOUL NATIONAL UNIVERSITY R&DB FOUNDATION, Seoul (KR)

(72) Inventors: Sehyun Lee, Yongin-si (KR); Ji-Hwan Park, Seoul (KR); Kwihyun Kim, Yongin-si (KR); Soo-Yeon Lee, Seoul (KR); Sunhwa Lee, Yongin-si (KR); Kyunghoon Chung, Yongin-si (KR)

(73) Assignees: SAMSUNG DISPLAY CO., LTD., Gyeonggi-Do (KR); SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 0 days.

(21) Appl. No.: 19/286,899

(22) Filed: Jul. 31, 2025

(65) Prior Publication Data

US 2026/0038427 A1 Feb. 5, 2026

(30) Foreign Application Priority Data

Aug. 1, 2024 (KR) ........................ 10-2024-0102752

(51) Int. Cl.
*G09G 3/32* (2016.01)
*G09G 3/3233* (2016.01)

(52) U.S. Cl.
CPC ............. *G09G 3/32* (2013.01); *G09G 3/3233* (2013.01); *G09G 2300/043* (2013.01);
(Continued)

(58) Field of Classification Search
CPC .. G09G 3/32; G09G 3/3233; G09G 2300/043; G09G 2300/0819; G09G 2310/08; G09G 2320/064
See application file for complete search history.

(56) References Cited

U.S. PATENT DOCUMENTS

| | | | | |
|---|---|---|---|---|
| 11,514,842 | B2 | 11/2022 | Jung et al. | |
| 2021/0210002 | A1* | 7/2021 | Kim | G09G 3/32 |
| 2022/0319397 | A1* | 10/2022 | Kim | G09G 3/2003 |

FOREIGN PATENT DOCUMENTS

| | | | |
|---|---|---|---|
| KR | 1020230013608 | A | 1/2023 |
| KR | 1020240008809 | A | 1/2024 |

* cited by examiner

*Primary Examiner* — Robert J Michaud
(74) *Attorney, Agent, or Firm* — CANTOR COLBURN LLP

(57) ABSTRACT

A pixel of a display device includes a pulse width modulation ("PWM") circuit configured to generate a PWM signal based on a PWM data voltage and a sweep voltage, a constant current generation ("CCG") circuit configured to generate an emission current based on a CCG data voltage and the PWM signal, and a light-emitting element configured to emit light based on the emission current. The CCG circuit includes a CCG driving transistor configured to generate the emission current, a first capacitor including a first electrode which receives a first CCG power supply voltage having a relatively high power voltage level, and a second electrode connected to a gate of the CCG driving transistor, and a second capacitor including a first electrode connected to the gate of the CCG driving transistor, and a second electrode which receives the PWM signal generated by the PWM circuit.

20 Claims, 12 Drawing Sheets

(52) U.S. Cl.
CPC . *G09G 2300/0819* (2013.01); *G09G 2310/08* (2013.01); *G09G 2320/064* (2013.01)

PIXEL, DISPLAY DEVICE INCLUDING THE SAME AND ELECTRONIC DEVICE INCLUDING DISPLAY DEVICE

This application claims priority to Korean Patent Application No. 10-2024-0102752, filed on Aug. 1, 2024, and all the benefits accruing therefrom under 35 U.S.C. § 119, the content of which in its entirety is herein incorporated by reference.

BACKGROUND

1. Field

Embodiments of the inventive concept relate to a display device, and more particularly to a pixel that drives a light-emitting element according to a pulse width modulation ("PWM") method, and a display device including the pixel.

2. Description of the Related Art

A display device may display an image by driving a light-emitting element, such as a micro light-emitting diode ("uLED") or an organic light-emitting diode ("OLED"), according to a pulse amplitude modulation ("PAM") method or a pulse width modulation ("PWM") method, for example. In the PAM method, a gray level may be represented by adjusting an amount (or an amplitude) of a driving current provided to the light-emitting element. In the PWM method, the gray level may be represented by adjusting a time period (or a pulse width) during which the driving current is provided to the light-emitting element.

SUMMARY

A wavelength of light emitted by the light-emitting element such as the uLED may be shifted according to the amount of the driving current. Thus, in a case where the light-emitting element such as the uLED is driven in the PAM method, for example, a color shift phenomenon may occur, and the image may be distorted.

Some embodiments provide a pixel that drives a light-emitting element in a pulse width modulation ("PWM") method.

Some embodiments provide a display device including a pixel that drives a light-emitting element in a PWM method and having improved image quality.

In an embodiment of the disclosure, there is provided a pixel of a display device. The pixel includes a PWM circuit which generates a PWM signal based on a PWM data voltage and a sweep voltage, a constant current generation ("CCG") circuit which generates an emission current based on a CCG data voltage and the PWM signal, and a light-emitting element which emits light based on the emission current. The CCG circuit includes a CCG driving transistor which generates the emission current, a first capacitor including a first electrode which receives a first CCG power supply voltage having a relatively high power voltage level, and a second electrode connected to a gate of the CCG driving transistor, and a second capacitor including a first electrode connected to the gate of the CCG driving transistor, and a second electrode which receives the PWM signal generated by the PWM circuit.

In an embodiment, the sweep voltage may gradually increase in a sweep period. The PWM circuit may apply the sweep voltage as the PWM signal to the CCG circuit when the sweep voltage is higher than the PWM data voltage. The CCG circuit may start generating the emission current at a start point of the sweep period, and may stop generating the emission current in response to the sweep voltage.

In an embodiment, the sweep voltage applied to the CCG circuit may be transferred to the gate of the CCG driving transistor by coupling of the second capacitor.

In an embodiment, the CCG driving transistor may include the gate connected to the second electrode of the first capacitor and the first electrode of the second capacitor, a first terminal which receives the first CCG power supply voltage, and a second terminal connected to the light-emitting element.

In an embodiment, the CCG circuit may further include a first transistor which applies a reset voltage to the gate of the CCG driving transistor in response to a first scan signal, a second transistor which diode-connects the CCG driving transistor in response to a second scan signal, and a third transistor which applies the CCG data voltage to the second electrode of the second capacitor in response to a third scan signal.

In an embodiment, the third scan signal may be a write signal for an N-th pixel row in which the pixel is arranged, where N is an integer greater than or equal to 1. The second scan signal may be a write signal for an (N−1)-th pixel row. The first scan signal may be a write signal for an (N−2)-th pixel row.

In an embodiment, the first transistor may include a gate which receives the first scan signal, a first terminal which receives the reset voltage, and a second terminal connected to the gate of the CCG driving transistor, the second electrode of the first capacitor and the first electrode of the second capacitor. The second transistor may include a gate which receives the second scan signal, a first terminal connected to the second terminal of the CCG driving transistor, and a second terminal connected to the gate of the CCG driving transistor, the second electrode of the first capacitor and the first electrode of the second capacitor. The third transistor may include a gate which receives the third scan signal, a first terminal which receives the CCG data voltage, and a second terminal connected to the second electrode of the second capacitor.

In an embodiment, the CCG circuit may further include a fourth transistor which provides the emission current generated by the CCG driving transistor to the light-emitting element in response to an emission signal, a fifth transistor which applies a reference voltage to the second electrode of the second capacitor in response to a fourth scan signal, and a sixth transistor which initializes the light-emitting element in response to the first scan signal.

In an embodiment, the fourth transistor may include agate which receives the emission signal, a first terminal connected to the second terminal of the CCG driving transistor, and a second terminal connected to the light-emitting element. The fifth transistor may include a gate which receives the fourth scan signal, a first terminal connected to the second electrode of the second capacitor, and a second terminal which receives the reference voltage. The sixth transistor may include a gate which receives the first scan signal, a first terminal connected to an anode of the light-emitting element, and a second terminal which receives a second CCG power supply voltage having a relatively low power voltage level.

In an embodiment, the PWM circuit may include a third capacitor including a first electrode which receives a PWM power supply voltage, and a second electrode, and a PWM driving transistor including a gate connected to the second electrode of the third capacitor, a first terminal which receives the sweep voltage, and a second terminal which outputs the PWM signal.

In an embodiment, the PWM circuit may further include a seventh transistor which applies the sweep voltage to the first terminal of the PWM driving transistor in response to an emission signal, an eighth transistor which applies the PWM data voltage to the first terminal of the PWM driving transistor in response to a second scan signal, a ninth transistor which diode-connects the PWM driving transistor in response to the second scan signal, a tenth transistor which applies the PWM signal generated by the PWM driving transistor to the CCG circuit in response to a fourth scan signal, and an eleventh transistor which applies a reset voltage to the second electrode of the third capacitor in response to a first scan signal.

In an embodiment, the seventh transistor may include a gate which receives the emission signal, a first terminal which receives the sweep voltage, and a second terminal connected to the first terminal of the PWM driving transistor. The eighth transistor may include a gate which receives the second scan signal, a first terminal which receives the PWM data voltage, and a second terminal connected to the first terminal of the PWM driving transistor. The ninth transistor may include a gate which receives the second scan signal, a first terminal connected to the second terminal of the PWM driving transistor, and a second terminal connected to the gate of the PWM driving transistor and the second electrode of the third capacitor. The tenth transistor may include a gate which receives the fourth scan signal, a first terminal connected to the second terminal of the PWM driving transistor, and a second terminal connected to the CCG circuit. The eleventh transistor may include a gate which receives the first scan signal, a first terminal connected to the second electrode of the third capacitor, and a second terminal which receives the reset voltage.

In an embodiment, a frame period for the pixel may include an initialization period in which the first capacitor, the second capacitor, and a third capacitor included in the PWM circuit are initialized, a compensation period in which the PWM data voltage is provided to the PWM circuit, a threshold voltage of a PWM driving transistor included in the PWM circuit is compensated, and a threshold voltage of the CCG driving transistor is compensated, a writing period in which the CCG data voltage is provided to the CCG circuit, and a sweep period in which the sweep voltage gradually increases.

In an embodiment, the sweep period may include an emission period in which the sweep voltage is lower than the PWM data voltage, and the light-emitting element emits light, and a non-emission period in which the sweep voltage is higher than the PWM data voltage, and the light-emitting element does not emit light.

In an embodiment of the disclosure, there is provided a pixel of a display device. The pixel includes a first capacitor including a first electrode which receives a first CCG power supply voltage having a relatively high power voltage level, and a second electrode, a second capacitor including a first electrode connected to the second electrode of the first capacitor, and a second electrode, a CCG driving transistor including a gate connected to the second electrode of the first capacitor and the first electrode of the second capacitor, a first terminal which receives the first CCG power supply voltage, and a second terminal, a first transistor including a gate which receives a first scan signal, a first terminal which receives a reset voltage, and a second terminal connected to the gate of the CCG driving transistor, a second transistor including a gate which receives a second scan signal, a first terminal connected to the second terminal of the CCG driving transistor, and a second terminal connected to the gate of the CCG driving transistor, a third transistor including a gate which receives a third scan signal, a first terminal which receives a CCG data voltage, and a second terminal connected to the second electrode of the second capacitor, a fourth transistor including a gate which receives an emission signal, a first terminal connected to the second terminal of the CCG driving transistor, and a second terminal, a fifth transistor including a gate which receives a fourth scan signal, a first terminal connected to the second electrode of the second capacitor, and a second terminal which receives a reference voltage, a sixth transistor including a gate which receives the first scan signal, a first terminal, and a second terminal which receives a second CCG power supply voltage having a relatively low power voltage level, a third capacitor including a first electrode which receives a PWM power supply voltage, and a second electrode, a PWM driving transistor including a gate connected to the second electrode of the third capacitor, a first terminal, and a second terminal, a seventh transistor including a gate which receives the emission signal, a first terminal which receives a sweep voltage, and a second terminal connected to the first terminal of the PWM driving transistor, an eighth transistor including a gate which receives the second scan signal, a first terminal which receives a PWM data voltage, and a second terminal connected to the first terminal of the PWM driving transistor, a ninth transistor including a gate which receives the second scan signal, a first terminal connected to the second terminal of the PWM driving transistor, and a second terminal connected to the gate of the PWM driving transistor, a tenth transistor including a gate which receives the fourth scan signal, a first terminal connected to the second terminal of the PWM driving transistor, and a second terminal connected to the second electrode of the second capacitor, an eleventh transistor including a gate which receives the first scan signal, a first terminal connected to the second electrode of the third capacitor, and a second terminal which receives the reset voltage, and a light-emitting element including an anode connected to the second terminal of the fourth transistor and the first terminal of the sixth transistor, and a cathode which receives the second CCG power supply voltage.

In an embodiment, the CCG driving transistor, the PWM driving transistor, the fourth transistor, the seventh transistor and the tenth transistor may be P-type transistors, and wherein the first, second, third, fifth, sixth, eighth, ninth and eleventh transistors may be N-type transistors.

In an embodiment, a frame period for the pixel may include an initialization period in which the first scan signal, the fourth scan signal and the emission signal have a relatively high level, the second scan signal and the third scan signal have a relatively low level, and the first capacitor, the second capacitor, and the third capacitor are initialized, a compensation period in which the second scan signal, the fourth scan signal and the emission signal have the relatively high level, the first scan signal and the third scan signal have the relatively low level, the PWM data voltage is provided to the pixel, a threshold voltage of the PWM driving transistor is compensated, and a threshold voltage of the CCG driving transistor is compensated, a writing period in which the third scan signal and the emission signal have the relatively high level, the first scan signal, the second scan signal and the fourth scan signal have the relatively low level, and the CCG data voltage is provided to the pixel, and a sweep period in which the first scan signal, the second scan signal, the third scan signal, the fourth scan signal and the emission signal have the relatively low level, and the sweep voltage gradually increases.

In an embodiment, the sweep period may include an emission period in which the sweep voltage is lower than the PWM data voltage, and the light-emitting element emits light; and a non-emission period in which the sweep voltage is higher than the PWM data voltage, and the light-emitting element does not emit light.

In an embodiment of the disclosure, there is provided a display device including a display panel including a plurality of pixels, a scan driver which provides scan signals to each of the plurality of pixels, an emission driver which provides an emission signal to each of the plurality of pixels, a sweep driver which provides a sweep voltage to each of the plurality of pixels, a data driver which provides a PWM data voltage and a CCG data voltage to each of the plurality of pixels, and a controller which controls the scan driver, the emission driver, the sweep driver and the data driver. Each of the plurality of pixels includes a PWM circuit which generates a PWM signal based on the PWM data voltage and the sweep voltage, a CCG circuit which generates an emission current based on the CCG data voltage and the PWM signal, and a light-emitting element which emits light based on the emission current. The CCG circuit includes a CCG driving transistor which generates the emission current, a first capacitor including a first electrode which receives a first CCG power supply voltage having a relatively high power voltage level, and a second electrode connected to a gate of the CCG driving transistor, and a second capacitor including a first electrode connected to the gate of the CCG driving transistor, and a second electrode which receives the PWM signal generated by the PWM circuit.

In an embodiment, the sweep voltage may gradually increase in a sweep period. The PWM circuit may apply the sweep voltage as the PWM signal to the CCG circuit when the sweep voltage is higher than the PWM data voltage. The CCG circuit may start generating the emission current at a start point of the sweep period, and may stop generating the emission current in response to the sweep voltage. The sweep voltage applied to the CCG circuit may be transferred to the gate of the CCG driving transistor by coupling of the second capacitor.

By embodiments, there is provided an electronic device including a processor which provides input image data, and a display device which receives the input image data from the processor, and to display an image based on the input image data. The display device includes a display panel including a plurality of pixels, a scan driver which provides scan signals to each of the plurality of pixels, an emission driver which provides an emission signal to each of the plurality of pixels, a sweep driver which provides a sweep voltage to each of the plurality of pixels, a data driver which provides a PWM data voltage and a CCG data voltage to each of the plurality of pixels, and a controller which controls the scan driver, the emission driver, the sweep driver and the data driver. Each of the plurality of pixels includes a PWM circuit which generates a PWM signal based on the PWM data voltage and the sweep voltage, a CCG circuit which generates an emission current based on the CCG data voltage and the PWM signal, and a light-emitting element which emits light based on the emission current. The CCG circuit includes a CCG driving transistor which generates the emission current, a first capacitor including a first electrode which receives a first CCG power supply voltage having a relatively high power voltage level, and a second electrode connected to a gate of the CCG driving transistor, and a second capacitor including a first electrode connected to the gate of the CCG driving transistor, and a second electrode which receives the PWM signal generated by the PWM circuit.

As described above, in a pixel and a display device in embodiments, a PWM driving transistor in a PWM circuit may receive a sweep voltage at a terminal (e.g., a source) of the PWM driving transistor. Thus, during a sweep period in which the sweep voltage is gradually changed, a voltage of a gate of the PWM driving transistor may be substantially constant. Accordingly, when a CCG driving transistor generates an emission current, a voltage of a gate of the CCG driving transistor may not be distorted by the sweep voltage, and the emission current may have a desired target current level.

Further, in the pixel and the display device in embodiments, a CCG circuit that generates the emission current may include first and second capacitors connected to the gate of the CCG driving transistor, and a PWM signal received from the PWM circuit may be transferred to the gate of the CCG driving transistor by coupling of the second capacitor. Thus, while the CCG driving transistor changes from a turn-on state to a turn-off state, or during a falling time in which the emission current decreases, a voltage stored in the second capacitor, or the voltage in which a threshold voltage of the CCG driving transistor is reflected may be substantially maintained. Accordingly, even while the emission current decreases, a threshold voltage deviation between the CCG driving transistors of a plurality of pixels may be compensated, and an image quality of the display device may be improved.

BRIEF DESCRIPTION OF THE DRAWINGS

Illustrative, non-limiting embodiments will be more clearly understood from the following detailed description in conjunction with the accompanying drawings.

DETAILED DESCRIPTION

Figure 1:
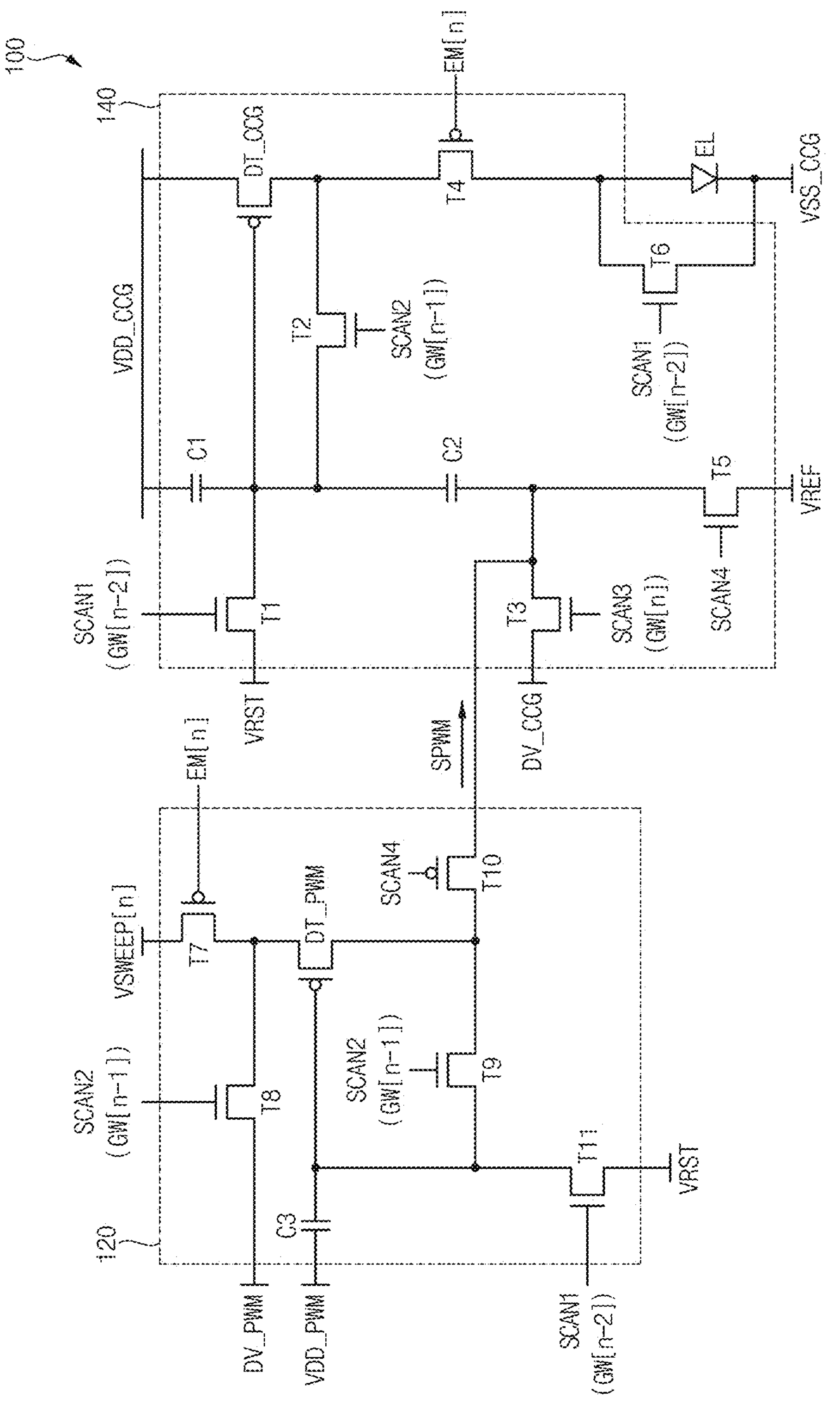
FIG. 1 is a circuit diagram illustrating an embodiment of a pixel of a display device.

Hereinafter, embodiments of the inventive concept will be explained in detail with reference to the accompanying drawings.

It will be understood that when an element is referred to as being "on" another element, it may be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," may therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" may, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). The term such as "about" may mean within one or more standard deviations, or within +30%, 20%, 10%, 5% of the stated value, for example.

The terms such as "processor" and "controller" as used herein are intended to mean a hardware component such as a circuitry that performs a predetermined function. The hardware component may include a field-programmable gate array ("FPGA") or an application-specific integrated circuit ("ASIC"), for example.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Figure 2:
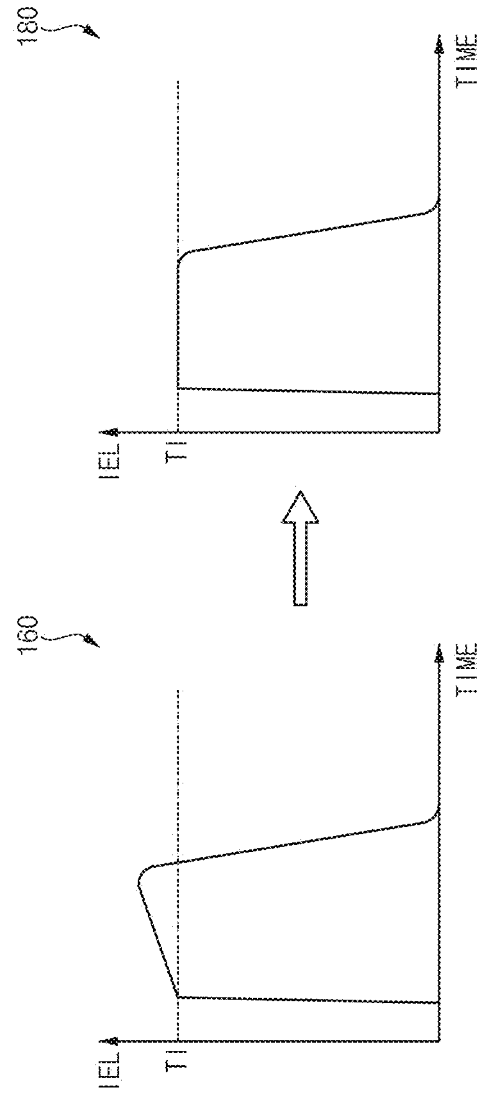
FIG. 2 is a diagram illustrating an embodiment of an emission current in a pixel in which a gate voltage of a pulse width modulation ("PWM") driving transistor is changed in a sweep period, and an embodiment of an emission current in a pixel.
Figure 3:
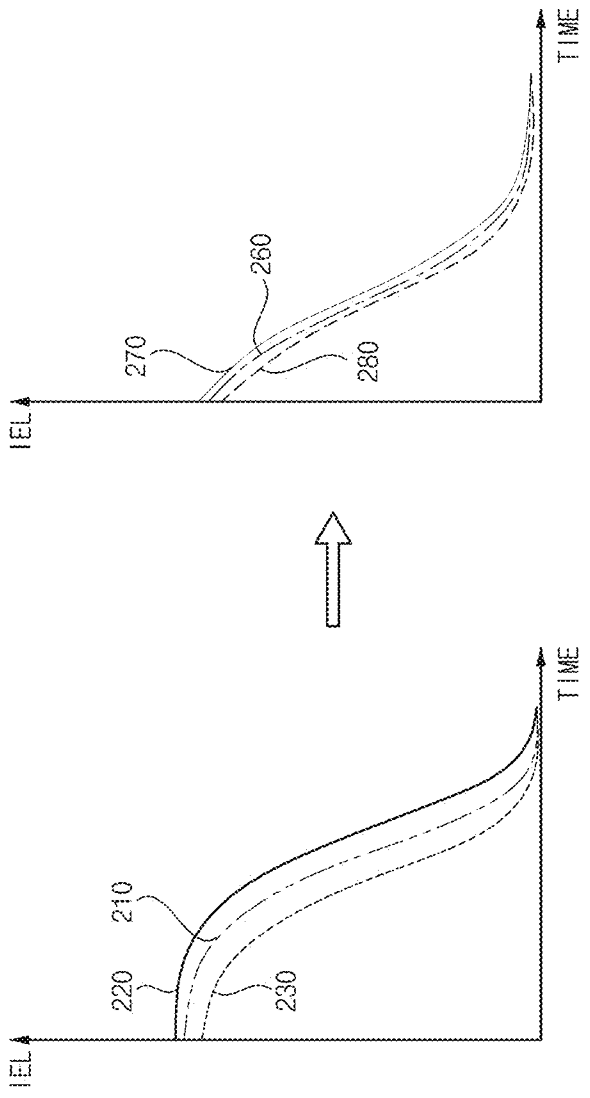
FIG. 3 is a diagram illustrating an embodiment of emission currents during a falling time duration in cases where a constant current generation ("CCG") driving transistor has different threshold voltages in a pixel in which a PWM signal is applied to a gate of the CCG driving transistor, and an embodiment of emission currents during a falling time duration in cases where a CCG driving transistor has different threshold voltages in a pixel.
Figure 4:
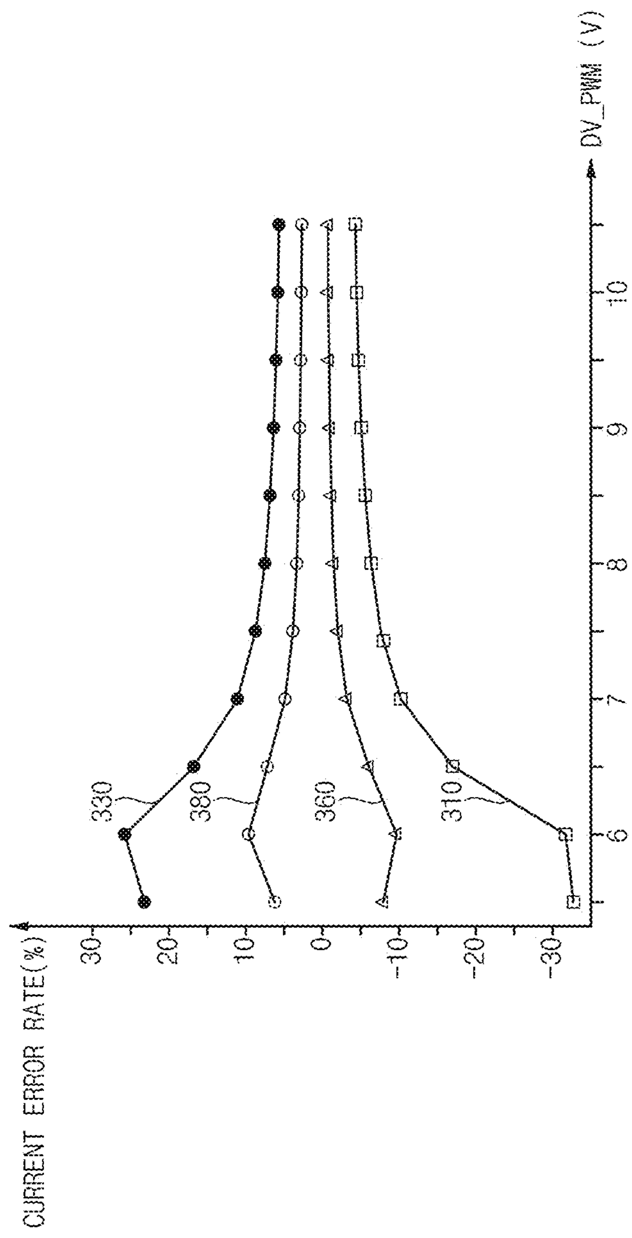
FIG. 4 is a diagram illustrating an embodiment of current error rates according to a PWM data voltage in cases where a threshold voltage of a CCG driving transistor is shifted in a pixel to which a PWM signal is applied to a gate of the CCG driving transistor, and an embodiment of current error rates according to the PWM data voltage in cases where a threshold voltage of a CCG driving transistor is shifted in a pixel.

FIG. 1 is a circuit diagram illustrating an embodiment of a pixel of a display device, FIG. 2 is a diagram illustrating an embodiment of an emission current in a pixel in which a gate voltage of a pulse width modulation ("PWM") driving transistor is changed in a sweep period, and an embodiment of an emission current in a pixel in embodiments, FIG. 3 is a diagram illustrating an embodiment of emission currents during a falling time duration in cases where a constant current generation ("CCG") driving transistor has different threshold voltages in a pixel in which a PWM signal is applied to a gate of the CCG driving transistor, and an embodiment of emission currents during a falling time duration in cases where a CCG driving transistor has different threshold voltages in a pixel in embodiments, and FIG. 4 is a diagram illustrating an embodiment of current error rates according to a PWM data voltage in cases where a threshold voltage of a CCG driving transistor is shifted in a pixel to which a PWM signal is applied to a gate of the CCG driving transistor, and an embodiment of current error rates according to the PWM data voltage in cases where a threshold voltage of a CCG driving transistor is shifted in a pixel.

Referring to FIG. 1, a pixel 100 of a display device in embodiments may include a pulse width modulation ("PWM") circuit 120 that generates a PWM signal SWPM based on a PWM data voltage DV_PWM and a sweep voltage VSWEEP[n], a constant current generation ("CCG") circuit 140 that generates an emission current based on a CCG data voltage DV_CCG and the PWM signal SWPM, and a light-emitting element EL that emits light based on the emission current.

The CCG circuit 140 may include a CCG driving transistor DT_CCG, a first capacitor C1 and a second capacitor C2. In some embodiments, the CCG circuit 140 may further include a first transistor T1, a second transistor T2, a third transistor T3, a fourth transistor T4, a fifth transistor T5 and a sixth transistor T6.

The CCG driving transistor DT_CCG may generate the emission current based on a voltage stored by the first and second capacitors C1 and C2. In some embodiments, the CCG driving transistor DT_CCG may include a gate connected to a second electrode of the first capacitor C1 and a first electrode of the second capacitor C2, a first terminal which receives a CCG high power supply voltage (also referred to as a first CCG power supply voltage) VDD_CCG having a relatively high power supply voltage level, and a second terminal connected to the light-emitting element EL through the fourth transistor T4.

The first capacitor C1 may be connected between a line which transfers the CCG high power supply voltage VDD_CCG and the gate of the CCG driving transistor DT_CCG, and the second capacitor C2 may be connected between the gate of the CCG driving transistor DT_CCG and a node to which the PWM circuit 120, the third transistor T3 and the fifth transistor T5 are connected. That is, the first capacitor C1 and the second capacitor C2 may be connected in series between the line which transfers the CCG high power supply voltage VDD_CCG and the node. In a conventional pixel, the PWM signal SWPM of the PWM circuit 120 may be directly applied to the gate of the CCG driving transistor DT_CCG. However, in the pixel 100 including the first and second capacitors C1 and C2 in embodiments, the PWM signal SWPM of the PWM circuit 120 may be applied to the second capacitor C2, and may be transferred to the gate of the CCG driving transistor DT_CCG by coupling of the second capacitor C2. In some embodiments, the first capacitor C1 may include a first electrode which receives the CCG high power supply voltage VDD_CCG, and a second electrode connected to the gate of the CCG driving transistor DT_CCG. The second capacitor C2 may include a first electrode connected to the second electrode of the first capacitor C1 and the gate of the CCG driving transistor DT_CCG, and a second electrode which receives the PWM signal SWPM generated by the PWM circuit 120 and is connected to the third transistor T3, the fifth transistor T5 and a tenth transistor T10 of the PWM circuit 120.

The first transistor T1 may apply a reset voltage VRST to the gate of the CCG driving transistor DT_CCG in response to a first scan signal SCAN1. In an embodiment, when the first scan signal SCAN1 has a relatively high level, the first transistor T1 may apply the reset voltage VRST to the second electrode of the first capacitor C1 and the first electrode of the second capacitor C2, for example. In some embodiments, the first transistor T1 may include a gate which receives the first scan signal SCAN1, a first terminal which receives the reset voltage VRST, and a second terminal connected to the gate of the CCG driving transistor DT_CCG, the second electrode of the first capacitor C1 and the first electrode of the second capacitor C2.

The second transistor T2 may diode-connect the CCG driving transistor DT_CCG in response to a second scan signal SCAN2. In an embodiment, when the second scan signal SCAN2 has the relatively high level, the second transistor T2 may connect the gate of the CCG driving transistor DT_CCG and the second terminal (e.g., a drain) of the CCG driving transistor DT_CCG to each other, for example. In some embodiments, the second transistor T2 may include a gate which receives the second scan signal SCAN2, a first terminal connected to the second terminal of the CCG driving transistor DT_CCG, and a second terminal connected to the gate of the CCG driving transistor DT_CCG, the second electrode of the first capacitor C1 and the first electrode of the second capacitor C2.

The third transistor T3 may apply the CCG data voltage DV_CCG to the second electrode of the second capacitor C2 in response to a third scan signal SCAN3. In some embodiments, the CCG data voltages DV_CCG provided to a plurality of pixels 100 included in the display device may be substantially the same voltage. Further, when the third scan signal SCAN3 has the relatively high level, the third transistor T3 may apply the CCG data voltage DV_CCG to the second electrode of the second capacitor C2, for example. The CCG data voltage DV_CCG applied to the second electrode of the second capacitor C2 may be divided by the first and second capacitors C1 and C2, and the divided CCG data voltage DV_CCG may be applied to the gate of the CCG driving transistor DT_CCG. In some embodiments, the third transistor T3 may include a gate which receives the third scan signal SCAN3, a first terminal which receives the CCG data voltage DV_CCG, and a second terminal connected to the second electrode of the second capacitor C2.

In some embodiments, the first scan signal SCAN1, the second scan signal SCAN2, and the third scan signal SCAN3 may be, but are not limited to, scan signals generated by the same shift register. Further, in a case where the pixel 100 is arranged in an N-th pixel row, where N is an integer greater than or equal to 1, the third scan signal SCAN3 may be a write signal GW[n] for the N-th pixel row, the second scan signal SCAN2 may be a write signal GW[n−1] for an (N−1)-th pixel row, and the first scan signal SCAN1 may be a write signal GW[n−2] for an (N−2)-th pixel row.

The fourth transistor T4 may provide the emission current generated by the CCG driving transistor DT_CCG to the light-emitting element EL in response to an emission signal EM[n]. In an embodiment, when the emission signal EM[n] has a relatively low level, the fourth transistor T4 may connect the CCG driving transistor DT_CCG to the light-emitting element EL, for example. In some embodiments, the fourth transistor T4 may include a gate which receives the emission signal EM[n], a first terminal connected to the second terminal of the CCG driving transistor DT_CCG, and a second terminal connected to the light-emitting element EL.

The fifth transistor T5 may apply a reference voltage VREF to the second electrode of the second capacitor C2 in response to a fourth scan signal SCAN4. In an embodiment, when the fourth scan signal SCAN4 has the relatively high level, the fifth transistor T5 may apply the reference voltage VREF to the second electrode of the second capacitor C2, for example. In some embodiments, the fifth transistor T5 may include a gate which receives the fourth scan signal SCAN4, a first terminal connected to the second electrode of the second capacitor C2, and a second terminal which receives the reference voltage VREF.

The sixth transistor T6 may initialize the light-emitting element EL in response to the first scan signal SCAN1. In an embodiment, when the first scan signal SCAN1 has the relatively high level, the sixth transistor T6 may apply a CCG low power supply voltage (also referred to as a second CCG power supply voltage) VSS_CCG having a relatively low power supply voltage level to an anode of the light-emitting element EL, for example. In some embodiments, the sixth transistor T6 may include a gate which receives the first scan signal SCAN1, a first terminal connected to the anode of the light-emitting element EL, and a second terminal which receives the CCG low power supply voltage VSS_CCG.

The PWM circuit 120 may include a PWM driving transistor DT_PWM and a third capacitor C3. In some embodiments, the PWM circuit 120 may further include a seventh transistor T7, an eighth transistor T8, a ninth transistor T9, the tenth transistor T10 and an eleventh transistor T11.

The PWM driving transistor DT_PWM may generate the PWM signal SPWM based on a voltage stored in the third capacitor C3 and the sweep voltage VSWEEP[n]. In an embodiment, when the sweep voltage VSWEEP[n] is higher than the PWM data voltage DV_PWM, the PWM driving transistor DT_PWM may be turned on, and may output the sweep voltage VSWEEP[n] as the PWM signal SPWM, for example. In the conventional pixel, the PWM driving transistor DT_PWM may receive the sweep voltage VSWEEP [n] at a gate of the PWM driving transistor DT_PWM. However, in the pixel 100 in embodiments, the PWM driving transistor DT_PWM may receive the sweep voltage VSWEEP[n] at a first terminal (e.g., a source) of the PWM driving transistor DT_PWM. In some embodiments, the PWM driving transistor DT_PWM may include a gate connected to a second electrode of the third capacitor C3, a first terminal which receives the sweep voltage VSWEEP[n] through the seventh transistor T7, and a second terminal which outputs the PWM signal SPWM.

The third capacitor C3 may be connected between a line which transfers a PWM power supply voltage VDD_PWM and the gate of the PWM driving transistor DT_PWM. In some embodiments, the third capacitor C3 may include a first electrode which receives the PWM power supply voltage VDD_PWM, and the second electrode connected to the gate of the PWM driving transistor DT_PWM. Since the first electrode of the third capacitor C3 receives the PWM power supply voltage VDD_PWM having a substantially constant voltage level instead of the sweep voltage VSWEEP[n], in a sweep period in which the sweep voltage VSWEEP[n] gradually changes (e.g., increases), a voltage of the second electrode of the third capacitor C3, or a voltage of the gate of the PWM driving transistor DT_PWM may be substantially constant.

The seventh transistor T7 may apply the sweep voltage VSWEEP[n] to the first terminal of the PWM driving transistor DT_PWM in response to the emission signal EM[n]. In an embodiment, when the emission signal EM[n] has the relatively low level, the seventh transistor T7 may connect the line which transfers the sweep voltage VSWEEP [n] and the first terminal of the PWM driving transistor DT_PWM to each other, for example. In some embodiments, the seventh transistor T7 may include a gate which receives the emission signal EM[n], a first terminal which receives the sweep voltage VSWEEP[n], and a second terminal connected to the first terminal of the PWM driving transistor DT_PWM.

The eighth transistor T8 may apply the PWM data voltage DV_PWM to the first terminal of the PWM driving transistor DT_PWM in response to the second scan signal SCAN2. In some embodiments, a voltage level of the PWM data voltage DV_PWM provided to each pixel 100 may be determined according to image data for the pixel 100. Further, a time length of an emission period within the sweep period may be determined according to the voltage level of the PWM data voltage DV_PWM, and a luminance of the pixel 100 may be determined according to the time length of the emission period. That is, the pixel 100 may be driven in a PWM method that controls the time length of the emission period, and the time length of the emission period may be adjusted by adjusting the voltage level of the PWM data voltage DV_PWM. Further, in some embodiments, the eighth transistor T8 may include a gate which receives the second scan signal SCAN2, a first terminal which receives the PWM data voltage DV_PWM, and a second terminal connected to the first terminal of the PWM driving transistor DT_PWM.

The ninth transistor T9 may diode-connect the PWM driving transistor DT_PWM in response to the second scan signal SCAN2. In an embodiment, when the second scan signal SCAN2 has the relatively high level, the ninth transistor T9 may connect the gate of the PWM driving transistor DT_PWM and the second terminal (e.g., a drain) of the PWM driving transistor DT_PWM to each other, for example. In some embodiments, the ninth transistor T9 may include a gate which receives the second scan signal SCAN2, a first terminal connected to the second terminal of the PWM driving transistor DT_PWM, and a second terminal connected to the gate of the PWM driving transistor DT_PWM and the second electrode of the third capacitor C3.

The tenth transistor T10 may apply the PWM signal SPWM generated by the PWM driving transistor DT_PWM to the CCG circuit 140 in response to the fourth scan signal SCAN4. In an embodiment, when the fourth scan signal SCAN4 has the relatively low level, the tenth transistor T10 may connect the second terminal of the PWM driving transistor DT_PWM to the second electrode of the second capacitor C2, for example. In some embodiments, the tenth transistor T10 may include a gate which receives the fourth scan signal SCAN4, a first terminal connected to the second terminal of the PWM driving transistor DT_PWM, and a second terminal connected to the second electrode of the second capacitor C2 of the CCG circuit 140.

The eleventh transistor T11 may apply the reset voltage VRST to the second electrode of the third capacitor C3 in response to the first scan signal SCAN1. In an embodiment, when the first scan signal SCAN1 has the relatively high level, the eleventh transistor T11 may apply the reset voltage VRST to the second electrode of the third capacitor C3, for example. In some embodiments, the eleventh transistor T11 may include a gate which receives the first scan signal SCAN1, a first terminal connected to the second electrode of the third capacitor C3, and a second terminal which receives the reset voltage VRST.

The light-emitting element EL may emit light based on the emission current generated by the CCG driving transistor DT_CCG. In some embodiments, the light-emitting element EL may be, but is not limited to, a micro-light-emitting diode ("uLED"). In other embodiments, the light-emitting element EL may be an organic light-emitting diode ("OLED"). In still other embodiments, the light-emitting element EL may be a nano light-emitting diode ("NED"), a quantum dot ("QD") light-emitting diode, an inorganic light-emitting diode, or any other suitable light-emitting element. Further, in some embodiments, the light-emitting element EL may include the anode connected to the second terminal of the fourth transistor T4 and the first terminal of the sixth transistor T6, and a cathode which receives the CCG low power supply voltage VSS_CCG.

In some embodiments, as illustrated in FIG. 1, the CCG driving transistor DT_CCG, the PWM driving transistor DT_PWM, and the fourth, seventh and tenth transistors T4, T7 and T10 may be P-type transistors, and the first, second, third, fifth, sixth, eighth, ninth and eleventh transistors T1, T2, T3, T5, T6, T8, T9 and T11 may be N-type transistors. In an embodiment, the CCG driving transistor DT_CCG, the PWM driving transistor DT_PWM, and the fourth, seventh and tenth transistors T4, T7 and T10 may be, but are not limited to, P-type low-temperature polycrystalline silicon ("LTPS") thin film transistors, and the first, second, third, fifth, sixth, eighth, ninth and eleventh transistors T1, T2, T3, T5, T6, T8, T9 and T11 may be, but are not limited to, N-type amorphous indium-gallium-zinc oxide ("a-IGZO") thin film transistors, for example. In other embodiments, all of the transistors may be P-type transistors. In still other embodiments, all of the transistors may be N-type transistors. In still other embodiments, some of the transistors may be P-type transistors and the remaining transistors may be N-type transistors.

In the conventional pixel, the gate of the PWM driving transistor DT_PWM may receive the sweep voltage VSWEEP[n] through the third capacitor C3. In this case, in the sweep period, a voltage of the gate of the PWM driving transistor DT_PWM gradually changes, and a voltage of the second terminal (e.g., the drain) of the PWM driving transistor DT_PWM also may change due to a parasitic capacitor between the gate and the second terminal of the PWM driving transistor DT_PWM. Further, when the voltage of the second terminal of the PWM driving transistor DT_PWM changes, a voltage of the gate of the CCG driving transistor DT_CCG changes through the tenth transistor T10 and the second capacitor C2, and the emission current IEL generated by the CCG driving transistor DT_CCG may be distorted. In the conventional pixel, as illustrated as a first graph 160 of FIG. 2, the emission current IEL generated by the CCG driving transistor DT_CCG may gradually increase from a desired target current TI, for example. In this case, a light emission efficiency of the light-emitting element EL may decrease, a color coordinate of the pixel 100 may be distorted, and a color shift phenomenon may occur in the display device.

However, in the pixel 100 in embodiments, the first terminal (e.g., the source) of the PWM driving transistor DT_PWM may receive the sweep voltage VSWEEP[n] through the seventh transistor T7, and the gate of the PWM driving transistor DT_PWM may receive the PWM power supply voltage VDD_PWM having the substantially constant voltage level through the third capacitor C3. Thus, even when the sweep voltage VSWEEP[n] gradually changes (e.g., increases) in the sweep period, the voltage of the gate of the PWM driving transistor DT_PWM may be substantially constant. Accordingly, the emission current IEL generated by the CCG driving transistor DT_CCG may not be distorted. In an embodiment, as illustrated in a second graph 180 of FIG. 2, the emission current IEL generated by the CCG driving transistor DT_CCG may be maintained at the desired target current TI (until the PWM driving transistor DT_PWM is turned on), for example. Accordingly, the light emission efficiency of the light-emitting element EL may be maintained, the color coordinate of the pixel 100 may not be distorted, and the color shift phenomenon may not occur in the display device.

In the pixel 100, the PWM circuit 120 may apply the PWM signal SPWM to the CCG circuit 140 when the sweep voltage VSWEEP[n] is higher than the PWM data voltage DV_PWM, and the CCG driving transistor DT_CCG may be turned off in response to the PWM signal SPWM. In an ideal case, when the sweep voltage VSWEEP[n] becomes higher than the PWM data voltage DV_PWM, the CCG driving transistor DT_CCG is immediately turned off, and the emission current IEL generated by the CCG driving transistor DT_CCG may be rapidly decreased. However, in an actual case, when the sweep voltage VSWEEP[n] becomes higher than the PWM data voltage DV_PWM, the CCG driving transistor DT_CCG changes from a turn-on state to a turn-off state for a predetermined time period, and the emission current IEL may be decreased for the predetermined time period. That is, when the sweep voltage VSWEEP[n] becomes higher than the PWM data voltage DV_PWM, the emission current IEL may be decreased for a falling time from the desired target current TI.

Further, in the conventional pixel, the PWM signal SPWM generated by the PWM circuit 120 may be directly applied to the gate of the CCG driving transistor DT_CCG. In a case where the CCG driving transistors DT_CCG of a plurality of conventional pixels of a conventional display device have different threshold voltages, since the PWM signal SPWM that is unrelated to the threshold voltage of the CCG driving transistor DT_CCG is applied to the gate of the CCG driving transistor DT_CCG of each conventional pixel, the plurality of conventional pixels may emit light with different luminances during the falling time duration. FIG. 3 illustrates an emission current 210 during the falling time duration in a conventional pixel in which the threshold voltage of the CCG driving transistor DT_CCG is not shifted, an emission current 220 during the falling time duration in a conventional pixel in which the threshold voltage of the CCG driving transistor DT_CCG is shifted in a positive direction, and an emission current 230 during the falling time duration in a conventional pixel in which the threshold voltage of the CCG driving transistor DT_CCG is shifted in a negative direction. As illustrated in FIG. 3, the conventional pixels including the CCG driving transistors DT_CCG having different threshold voltages may generate the different emission currents 210, 220 and 230 during the falling time duration, and may emit light with different luminances based on the different emission currents 210, 220 and 230.

However, in the pixel 100 in embodiments, the PWM signal SPWM generated by the PWM circuit 120 may be applied to the second electrode of the second capacitor C2, and may be transferred to the gate of the CCG driving transistor DT_CCG by the coupling of the second capacitor C2. Accordingly, while the CCG driving transistor DT_CCG changes from the turn-on state to the turn-off state, or during the falling time duration in which the emission current IEL decreases, the second capacitor C2 of each pixel 100 may substantially maintain a voltage in which the threshold voltage of the CCG driving transistor DT_CCG is reflected, and thus the threshold voltage of the CCG driving transistor DT_CCG may be reflected in the voltage of the gate of the CCG driving transistor DT_CCG of each pixel 100. Therefore, even when the CCG driving transistors DT_CCG of the plurality of pixels of the display device in embodiments have different threshold voltages, the plurality of pixels may emit light with a substantially constant luminance during the falling time duration. FIG. 3 illustrates an emission current 260 during the falling time duration in the pixel 100 in which the threshold voltage of the CCG driving transistor DT_CCG is not shifted, an emission current 270 during the falling time duration in the pixel 100 in which the threshold voltage of the CCG driving transistor DT_CCG is shifted in a positive direction, and an emission current 280 during the falling time duration in the pixel 100 in which the threshold voltage of the CCG driving transistor DT_CCG is shifted in a negative direction. As illustrated in FIG. 3, even when the CCG driving transistors DT_CCG have different threshold voltages, the pixels 100 in embodiments may generate the emission currents 260, 270 and 280 having a smaller difference than the emission currents 210, 220 and 230 of the conventional pixels during the falling time duration, and may emit light with the substantially constant luminance based on the emission currents 260, 270 and 280 having the smaller difference. Accordingly, the image quality of the display device in embodiments may be improved.

FIG. 4 illustrates a current error rate 310 of the emission current IEL according to the PWM data voltage DV_PWM in a conventional pixel in which an absolute value of the threshold voltage of the CCG driving transistor DT_CCG is increased by about 0.5 volt (V), a current error rate 330 of the emission current IEL according to the PWM data voltage DV_PWM in a conventional pixel in which the absolute value of the threshold voltage of the CCG driving transistor DT_CCG is decreased by about 0.5 V, a current error rate 360 of the emission current IEL according to the PWM data voltage DV_PWM in the pixel 100 in which the absolute value of the threshold voltage of the CCG driving transistor DT_CCG is increased by about 0.5 V, and a current error rate 380 of the emission current IEL according to the PWM data voltage DV_PWM in the pixel 100 in which the absolute value of the threshold voltage of the CCG driving transistor DT_CCG is decreased by about 0.5 V As illustrated in FIG. 4, in the conventional pixel, in cases where the threshold voltage of the CCG driving transistor DT_CCG is increased or decreased by about 0.5 V, the emission current IEL may increase or decrease by about 30%, and thus the luminance of the conventional pixel may increase or decrease by about 30%. However, in the pixel 100 in embodiments, when the threshold voltage of the CCG driving transistor DT_CCG is increased or decreased by about 0.5 V, the emission current IEL may increase or decrease by about 10%, and thus the luminance of the pixel 100 may increase or decrease by about 10%. Accordingly, the image quality of the display device including the pixel 100 in embodiments may be improved.

As described above, in the pixel 100 in embodiments, the PWM driving transistor DT_PWM may receive the sweep voltage VSWEEP[n] at the first terminal (e.g., the source). Thus, during the sweep period in which the sweep voltage VSWEEP[n] gradually changes, the voltage of the gate of the PWM driving transistor DT_PWM may be substantially constant. Accordingly, when the CCG driving transistor DT_CCG generates the emission current IEL, the voltage of the gate of the CCG driving transistor DT_CCG may not be distorted by the sweep voltage VSWEEP[n], and the emission current IEL may have a current level substantially equal to the desired target current TI. Further, in the pixel 100 in embodiments, the CCG circuit 140 may include the first and second capacitors C1 and C2 connected to the gate of the CCG driving transistor DT_CCG, and the PWM signal SPWM generated by the PWM circuit 120 may be transferred to the gate of the CCG driving transistor DT_CCG by the coupling of the second capacitor C2. Thus, while the CCG driving transistor DT_CCG changes from the turn-on state to the turn-off state, or during the falling time duration in which the emission current IEL decreases, the voltage stored in the second capacitor C2, or the voltage in which the threshold voltage of the CCG driving transistor DT_CCG is reflected may be substantially maintained. Accordingly, even while the emission current IEL decreases, a threshold voltage deviation between the CCG driving transistors DT_CCG of the plurality of pixels may be compensated, and the image quality of the display device may be improved.

Hereinafter, an operation of the pixel 100 in embodiments is described below with reference to FIGS. 1, and 5 through 10.

Figure 5:
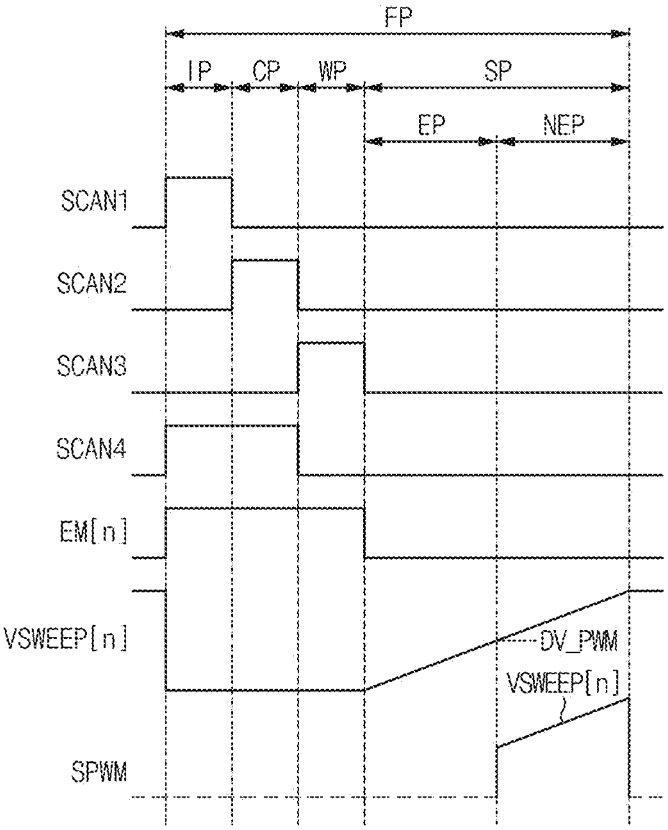
FIG. 5 is a timing diagram for describing an embodiment of an operation of a pixel.
Figure 6:
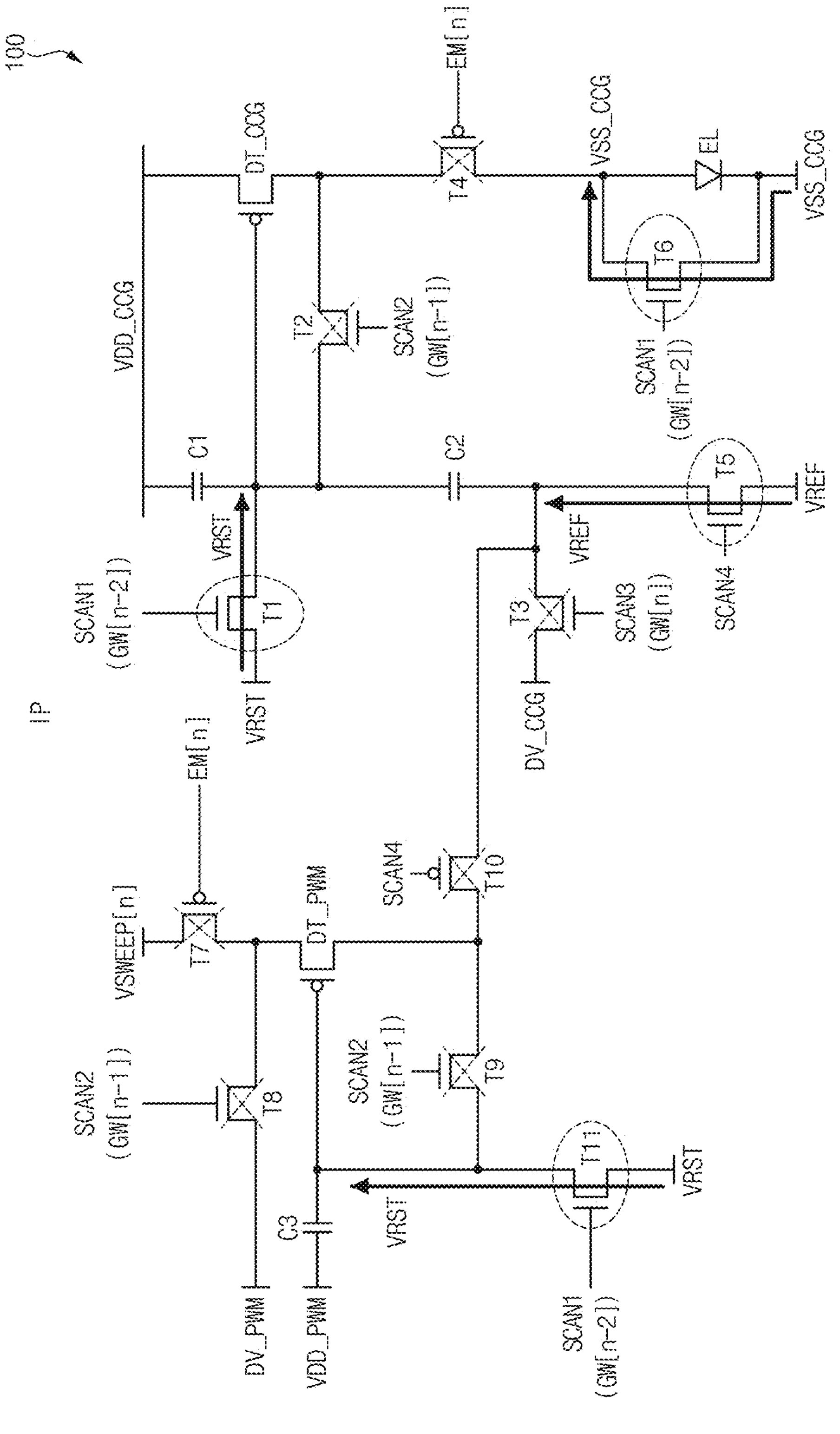
FIG. 6 is a circuit diagram for describing an embodiment of an operation of a pixel in an initialization period.
Figure 7:
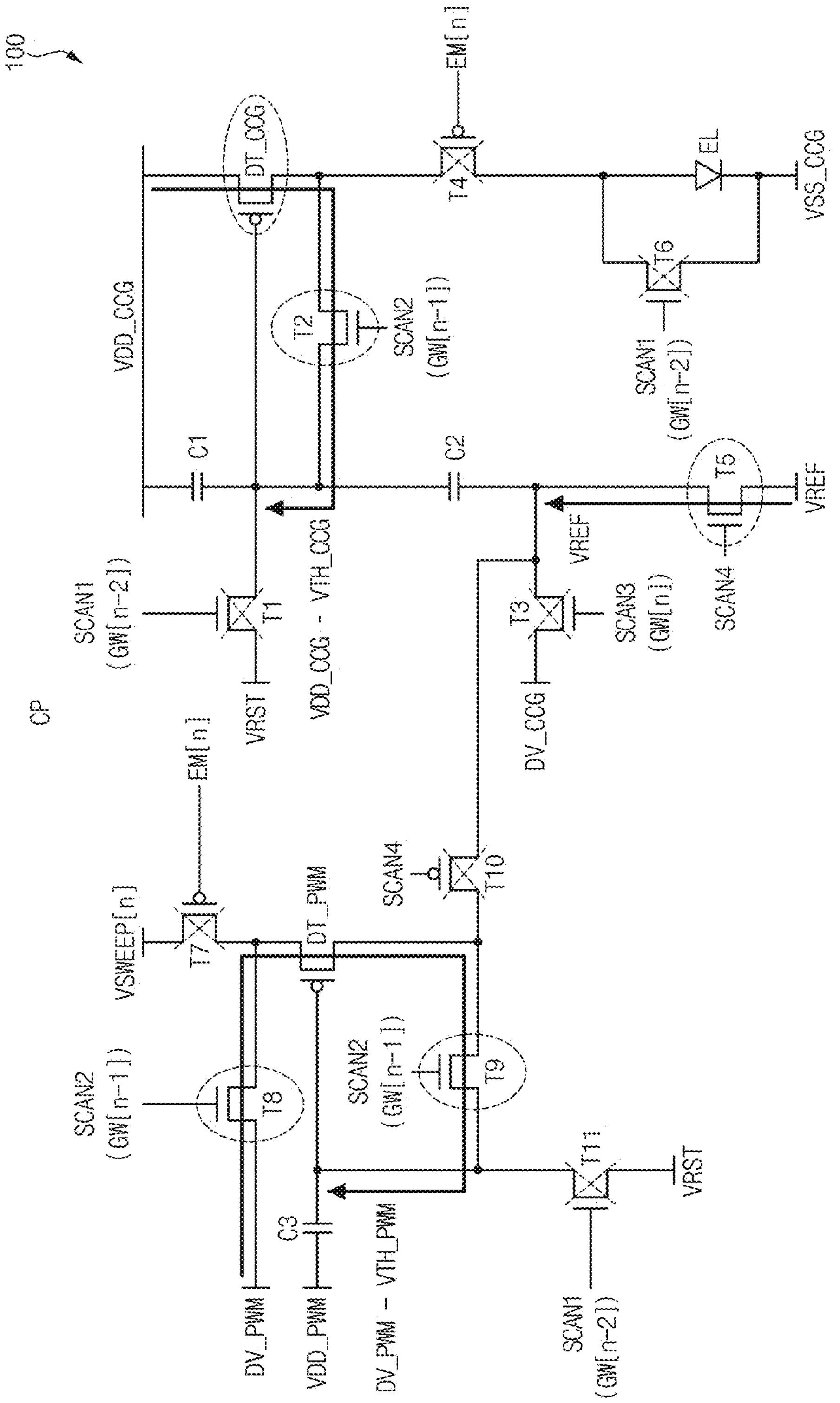
FIG. 7 is a circuit diagram for describing an embodiment of an operation of a pixel in a compensation period.
Figure 8:
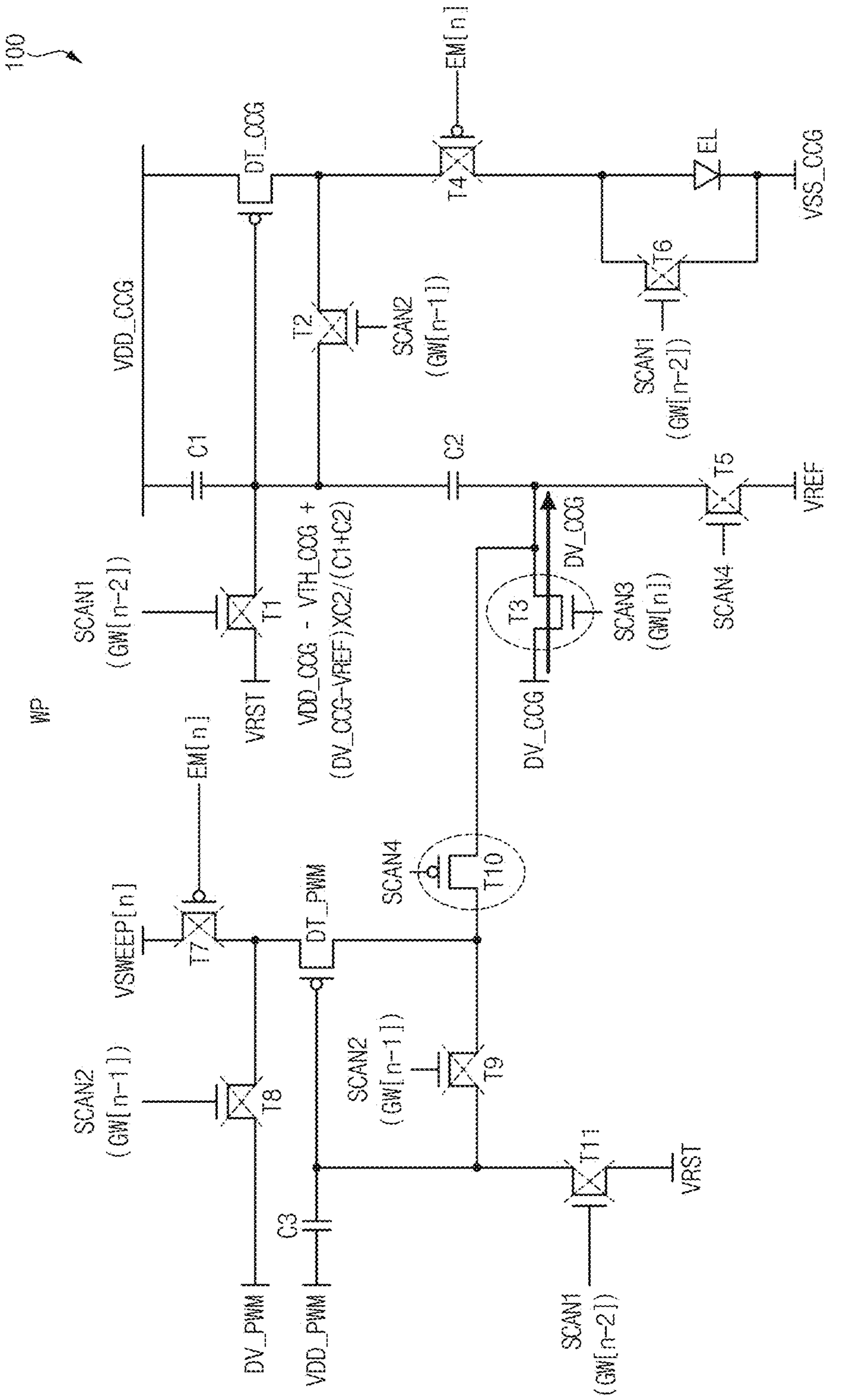
FIG. 8 is a circuit diagram for describing an embodiment of an operation of a pixel in a writing period.
Figure 9:
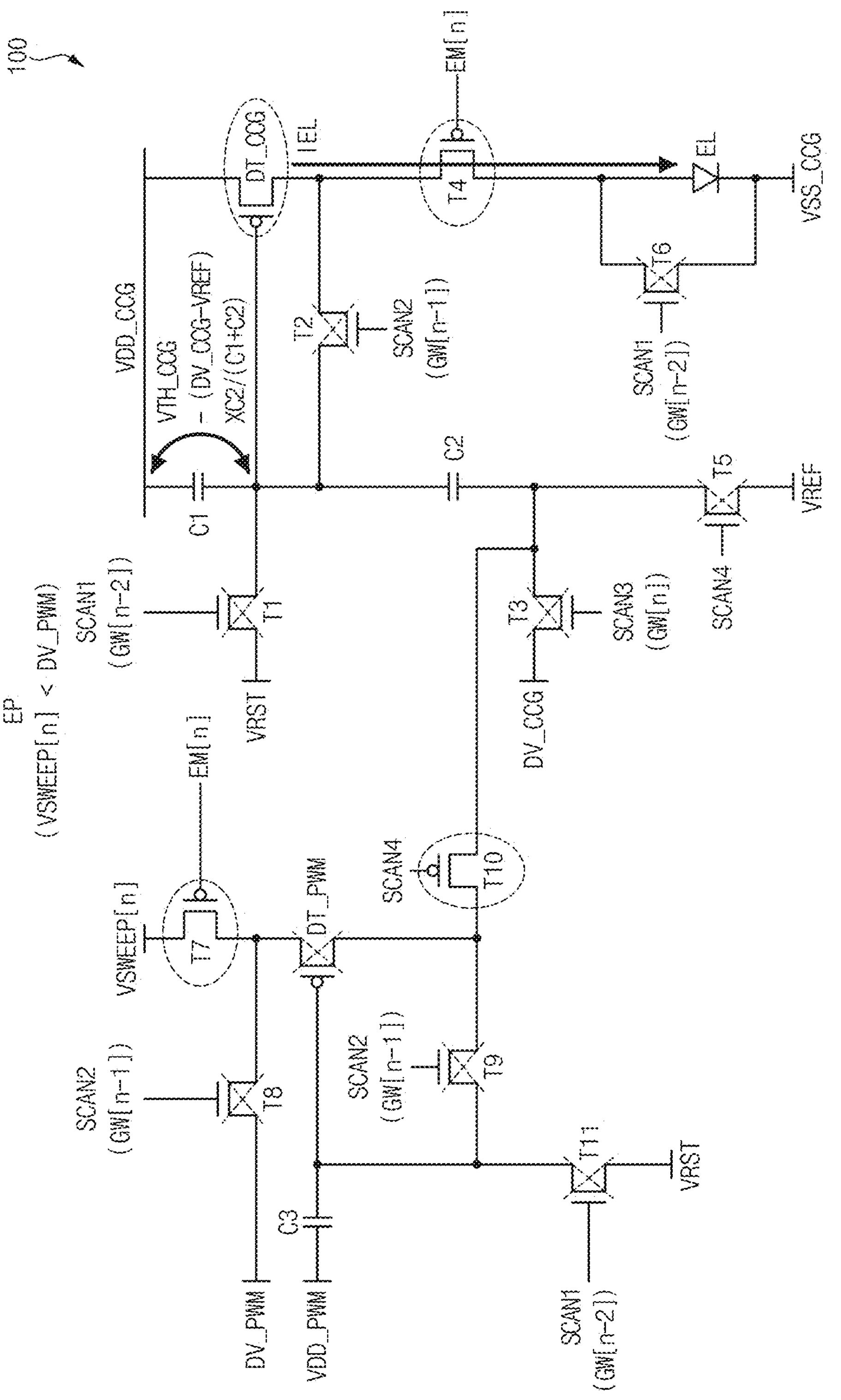
FIG. 9 is a circuit diagram for describing an embodiment of an operation of a pixel in an emission period within a sweep period.
Figure 10:
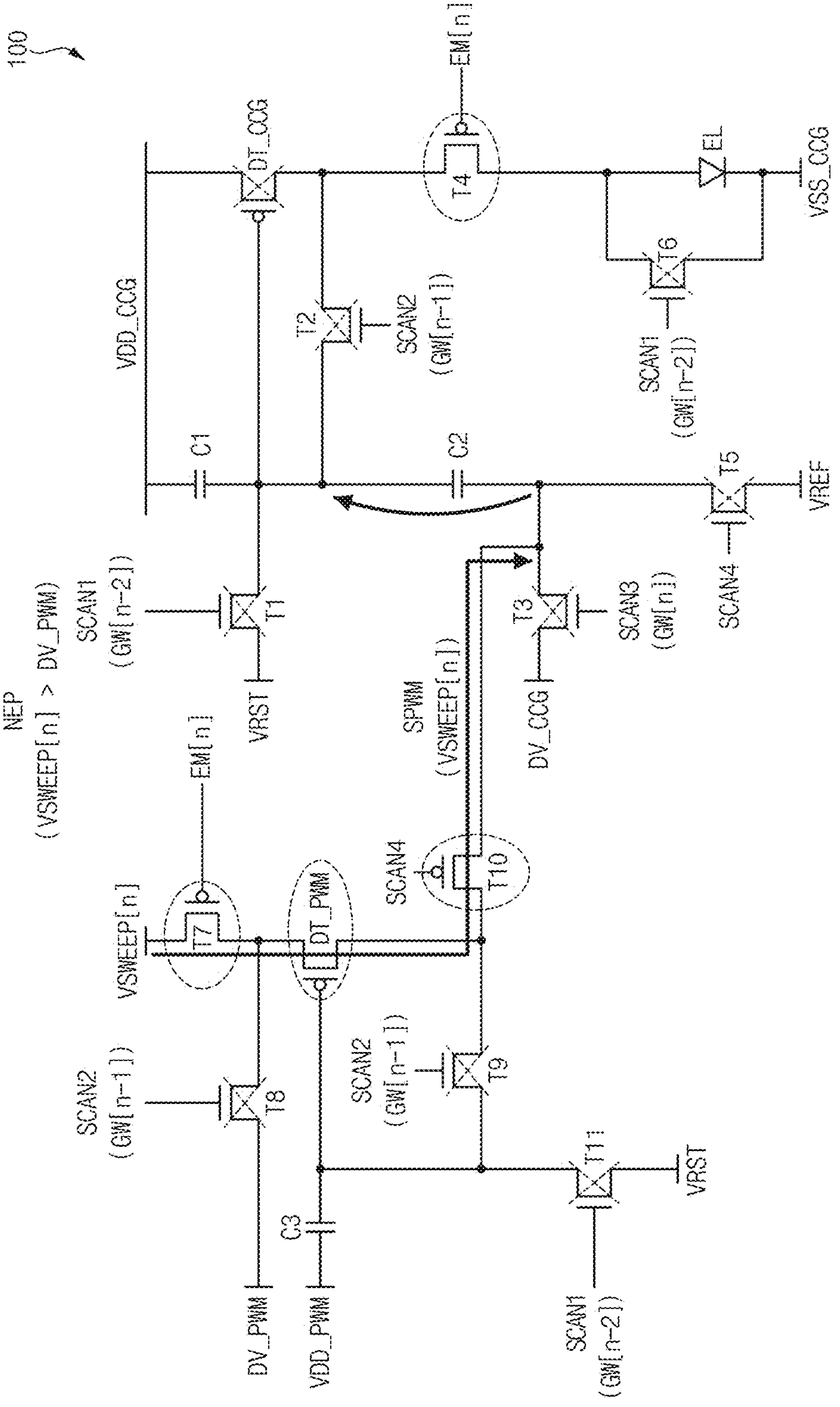
FIG. 10 is a circuit diagram for describing an embodiment of an operation of a pixel in a non-emission period within a sweep period.

FIG. 5 is a timing diagram for describing an embodiment of an operation of a pixel, FIG. 6 is a circuit diagram for describing an embodiment of an operation of a pixel in an initialization period, FIG. 7 is a circuit diagram for describing an embodiment of an operation of a pixel in a compensation period, FIG. 8 is a circuit diagram for describing an embodiment of an operation of a pixel in a writing period, FIG. 9 is a circuit diagram for describing an embodiment of an operation of a pixel in an emission period within a sweep period, and FIG. 10 is a circuit diagram for describing an embodiment of an operation of a pixel in a non-emission period within a sweep period.

Referring to FIGS. 1 and 5, a frame period FP for the pixel 100 may include an initialization period IP in which the first capacitor C1, the second capacitor C2, the third capacitor C3 and a parasitic capacitor of the light-emitting element EL are initialized, a compensation period CP in which the PWM data voltage DV_PWM is provided to the PWM circuit 120, the threshold voltage of the PWM driving transistor DT_PWM is compensated, and the threshold voltage of the CCG driving transistor DT_CCG is compensated, a writing period WP in which the CCG data voltage DV_CCG is provided to the CCG circuit 140, and a sweep period SP in which the sweep voltage VSWEEP[n] gradually changes (e.g., increases). In some embodiments, the sweep period SP may include an emission period EP in which the sweep voltage VSWEEP[n] is lower than the PWM data voltage DV_PWM and the light-emitting element EL emits light, and a non-emission period NEP in which the sweep voltage VSWEEP[n] is higher than the PWM data voltage DV_PWM and the light-emitting element EL does not emit light.

In the initialization period IP, the first scan signal SCAN1, the fourth scan signal SCAN4 and the emission signal EM[n] may have a relatively high level, and the second scan signal SCAN2 and the third scan signal SCAN3 may have a relatively low level. In an embodiment, as illustrated in FIG. 6, the first transistor T1 may be turned on in response to the first scan signal SCAN1, the fifth transistor T5 may be turned on in response to the fourth scan signal SCAN4, the sixth transistor T6 may be turned on in response to the first scan signal SCAN1, and the eleventh transistor T11 may be turned on in response to the first scan signal SCAN1, for example. The first transistor T1 may apply the reset voltage VRST to the second electrode of the first capacitor C1 and the first electrode of the second capacitor C2, and the fifth transistor T5 may apply the reference voltage VREF to the second electrode of the second capacitor C2. Thus, the first capacitor C1 may be initialized based on the CCG high power supply voltage VDD_CCG and the reset voltage VRST, and the second capacitor C2 may be initialized based on the reset voltage VRST and the reference voltage VREF. The eleventh transistor T11 may apply the reset voltage VRST to the second electrode of the third capacitor C3, and thus the third capacitor C3 may be initialized based on the PWM power supply voltage VDD_PWM and the reset voltage VRST. Further, the sixth transistor T6 may apply the CCG low power supply voltage VSS_CCG to the anode of the light-emitting element EL, and thus the parasitic capacitor of the light-emitting element EL may be initialized based on the CCG low power supply voltage VSS_CCG. The second, third, fourth, seventh, eighth, ninth and tenth transistors T2, T3, T4, T7, T8, T9 and T10 may be turned off.

In the compensation period CP, the second scan signal SCAN2, the fourth scan signal SCAN4 and the emission signal EM[n] may have the relatively high level, and the first scan signal SCAN1 and the third scan signal SCAN3 may have the relatively low level. In an embodiment, as illustrated in FIG. 7, the second transistor T2 may be turned on in response to the second scan signal SCAN2, the fifth transistor T5 may be turned on in response to the fourth scan signal SCAN4, the eighth transistor T8 may be turned on in response to the second scan signal SCAN2, and the ninth transistor T9 may be turned on in response to the second scan signal SCAN2, for example. The second transistor T2 may diode-connect the CCG driving transistor DT_CCG, and the voltage of the gate of the CCG driving transistor DT_CCG may become a voltage VDD_CCG-VTH_CCG obtained by subtracting the threshold voltage VTH_CCG of the CCG driving transistor DT_CCG from the CCG high power supply voltage VDD_CCG. Thus, the first and second capacitors C1 and C2 may store a voltage in which the threshold voltage VTH_CCG of the CCG driving transistor DT_CCG is compensated. Further, the eighth transistor T8 may apply the PWM data voltage DV_PWM to the first terminal of the PWM driving transistor DT_PWM, the ninth transistor T9 may diode-connect the PWM driving transistor DT_PWM, and thus the voltage of the gate of the PWM driving transistor DT_PWM may become a voltage DV_PWM-VTH_PWM obtained by subtracting the threshold voltage VTH_PWM of the PWM driving transistor DT_PWM from the PWM data voltage DV_PWM. Thus, the third capacitor C3 may store the PWM data voltage DV_PWM-VTH_PWM in which the threshold voltage VTH_PWM of the PWM driving transistor DT_PWM is compensated. The first, third, fourth, sixth, seventh, tenth and eleventh transistors T1, T3, T4, T6, T7, T10 and T11 may be turned off.

In the writing period WP, the third scan signal SCAN3 and the emission signal EM[n] may have the relatively high level, and the first scan signal SCAN1, the second scan signal SCAN2 and the fourth scan signal SCAN4 may have the relatively low level. In an embodiment, as illustrated in FIG. 8, the third transistor T3 may be turned on in response to the third scan signal SCAN3, and the tenth transistor T10 may be turned on in response to the fourth scan signal SCAN4, for example. Even when the tenth transistor T10 is turned on, since the seventh and ninth transistors T7 and T9 are turned off, the tenth transistor T10 may not affect the voltage of the second electrode of the second capacitor C2. The third transistor T3 may apply the CCG data voltage DV_CCG to the second electrode of the second capacitor C2, and the voltage of the second electrode of the second capacitor C2 may be changed from the reference voltage VREF to the CCG data voltage DV_CCG by a voltage difference DV_CCG-VREF between the CCG data voltage DV_CCG and the reference voltage VREF. Further, by the serially connected first and second capacitors C1 and C2, the voltage of the gate of the CCG driving transistor DT_CCG may become "VDD_CCG−VTH_CCG+(DV_CCG−VREF)×C2/(C1+C2)". The first, second, fourth, fifth, sixth, seventh, eighth, ninth and eleventh transistors T1, T2, T4, T5, T6, T7, T8, T9 and T11 may be turned off.

In the sweep period SP, the first scan signal SCAN1, the second scan signal SCAN2, the third scan signal SCAN3, the fourth scan signal SCAN4 and the emission signal EM[n] may have the relatively low level, and the sweep voltage VSWEEP[n] may gradually increase. In the sweep period SP, the fourth and seventh transistors T4 and T7 may be turned on in response to the emission signal EM[n], the tenth transistor T10 may be turned on in response to the fourth scan signal SCAN4, and the first, second, third, fifth, sixth, eighth, ninth and eleventh transistors T1, T2, T3, T5, T6, T8, T9 and T11 may be turned on.

Further, in the emission period EP in which the sweep voltage VSWEEP[n] is lower than the PWM data voltage DV_PWM, as illustrated in FIG. 9, the PWM driving transistor DT_PWM may be turned off. In an embodiment, the voltage of the gate of the PWM driving transistor DT_PWM may be "DV_PWM-VTH_PWM", and thus a source-gate voltage of the PWM driving transistor DT_PWM may be "VSWEEP[n]-DV_PWM+VTH_PWM", for example. Thus, when the sweep voltage VSWEEP[n] is lower than the PWM data voltage DV_PWM, the source-gate voltage of the PWM driving transistor DT_PWM may be lower than the threshold voltage VTH_PWM of the PWM driving transistor DT_PWM, and the PWM driving transistor DT_PWM may be turned off. Further, since the voltage of the gate of the CCG driving transistor DT_CCG is "VDD_CCG−VTH_CCG+(DV_CCG-VREF)×C2/(C1+C2)", the voltage stored between the first and second electrodes of the first capacitor C1, or a source-gate voltage of the CCG driving transistor DT_CCG may be "VTH_CCG−(DV_CCG-VREF)×C2/(C1+C2)". Thus, the CCG driving transistor DT_CCG may generate the emission current IEL corresponding to "(DV_CCG-VREF)×C2/(C1+C2)" regardless of the threshold voltage VTH_CCG of the CCG driving transistor DT_CCG.

The PWM driving transistor DT_PWM may receive the sweep voltage VSWEEP[n] at the first terminal (e.g., source) of the PWM driving transistor DT_PWM. Thus, during the sweep period SP, the voltage of the gate of the PWM driving transistor DT_PWM may be substantially constant. Accordingly, when the CCG driving transistor DT_CCG generates the emission current IEL, the voltage of the gate of the CCG driving transistor DT_CCG may not be distorted by the sweep voltage VSWEEP[n], and the emission current IEL may have a current level substantially equal to a desired target current TI (refer to FIG. 2).

When the sweep voltage VSWEEP[n] becomes higher than the PWM data voltage DV_PWM, or in the non-emission period NEP in which the sweep voltage VSWEEP[n] is higher than the PWM data voltage DV_PWM, as illustrated in FIG. 10, the PWM driving transistor DT_PWM may be turned on. In an embodiment, when the sweep voltage VSWEEP[n] is higher than the PWM data voltage DV_PWM, the source-gate voltage of the PWM driving transistor DT_PWM may be higher than the threshold voltage VTH_PWM of the PWM driving transistor DT_PWM, and the PWM driving transistor DT_PWM may be turned on, for example. Thus, the PWM driving transistor DT_PWM may output the sweep voltage VSWEEP[n] as the PWM signal SPWM, and the tenth transistor T10 may apply the sweep voltage VSWEEP[n] as the PWM signal SPWM to the second electrode of the second capacitor C2. The sweep voltage VSWEEP[n] applied to the second electrode of the second capacitor C2 may be transferred to the gate of the CCG driving transistor DT_CCG by the coupling of the second capacitor C2. Thus, the CCG driving transistor DT_CCG may be turned off based on the sweep voltage VSWEEP[n] applied to the gate of the CCG driving transistor DT_CCG, the emission current IEL may not be provided to the light-emitting element EL, and the light-emitting element EL may not emit light. That is, the CCG circuit 140 may start generating the emission current IEL at a start point of the sweep period SP, and may stop generating the emission current IEL in response to the sweep voltage VSWEEP[n].

However, when the sweep voltage VSWEEP[n] becomes higher than the PWM data voltage DV_PWM, the CCG driving transistor DT_CCG may be immediately turned off in an ideal case, but the CCG driving transistor DT_CCG may change from the turn-on state to the turn-off state for a predetermined time period in an actual case. In the pixel 100 in embodiments, while the CCG driving transistor DT_CCG changes from the turn-on state to the turn-off state, or during the falling time duration in which the emission current IEL decreases, the voltage stored in the second capacitor C2, or the voltage in which the threshold voltage VTH_CCG of the CCG driving transistor DT_CCG is reflected may be substantially maintained. Accordingly, even while the emission current IEL decreases, the threshold voltage deviation between the CCG driving transistors DT_CCG of the plurality of pixels may be compensated, and the image quality of the display device may be improved.

Figure 11:
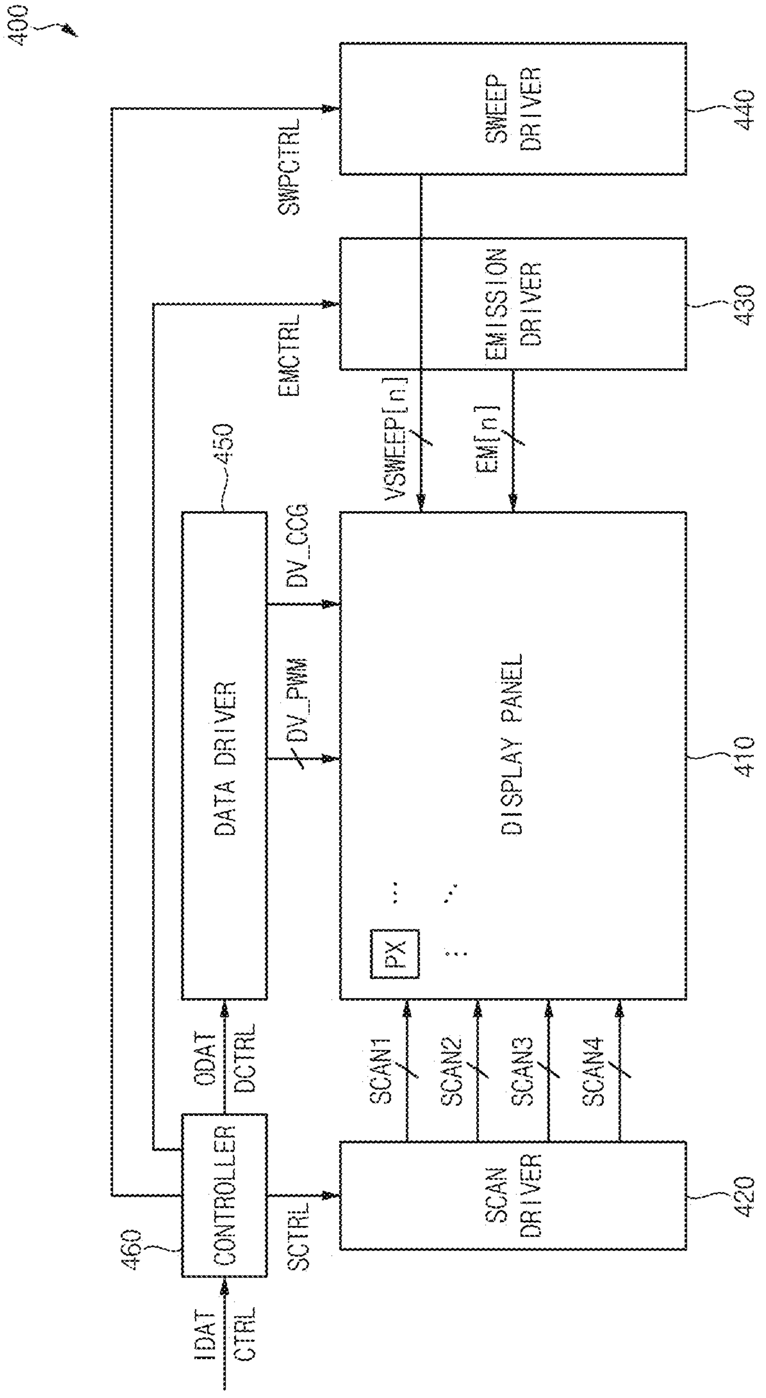
FIG. 11 is a block diagram illustrating an embodiment of a display device.

FIG. 11 is a block diagram illustrating an embodiment of a display device.

Referring to FIG. 11, a display device 400 in embodiments may include a display panel 410 that includes a plurality of pixels PX, a scan driver 420 that provides scan signals SCAN1, SCAN2, SCAN3 and SCAN4 to each of the plurality of pixels PX, an emission driver 430 that provides an emission signal EM[n] to each of the plurality of pixels PX, a sweep driver 440 that provides a sweep voltage VSWEEP[n] to each of the plurality of pixels PX, and a data driver 450 that provides a PWM data voltage DV_PWM and a CCG data voltage DV_CCG to each of the plurality of pixels PX, and a controller 460 that controls the scan driver 420, the emission driver 430, the sweep driver 440 and the data driver 450.

The display panel 410 may include a plurality of PWM data lines, a plurality of CCG data lines, a plurality of scan lines, a plurality of emission lines, and a plurality of pixels PX connected to the plurality of PWM data lines, the plurality of CCG data lines, the plurality of scan lines and the plurality of emission lines. Each pixel PX may be a pixel 100 illustrated in FIG. 1, or the like. In each pixel PX, a PWM driving transistor (e.g., DT_PWM in FIG. 1) may receive a sweep voltage VSWEEP[n] at a terminal (e.g., a source) of the PWM driving transistor. Thus, a voltage of a gate of a CCG driving transistor (e.g., DT_CCG in FIG. 1) may not be distorted by the sweep voltage VSWEEP[n], and the CCG driving transistor may generate an emission current having a desired target current level. Further, a CCG circuit of each pixel PX may include first and second capacitors connected to the gate of the CCG driving transistor, and a PWM signal may be transferred to the gate of the CCG driving transistor by coupling of the second capacitor. Accordingly, even while the emission current decreases, a threshold voltage deviation between the CCG driving transistors of the plurality of pixels PX may be compensated, and an image quality of the display device 400 may be improved.

The scan driver 420 may sequentially provide the scan signals SCAN1, SCAN2, SCAN3 and SCAN4 to the plurality of pixels PX on a row-by-row basis based on a scan control signal SCTRL received from the controller 460. In some embodiments, the scan control signal SCTRL may include, but is not limited to, a scan start signal and a scan clock signal. The scan driver 420 may include at least one shift register that sequentially generates the first, second, third, and fourth scan signals SCAN1, SCAN2, SCAN3 and SCAN4. In some embodiments, the first scan signal SCAN1, the second scan signal SCAN2, and the third scan signal SCAN3 may be generated by, but is not limited to, a single shift register. Further, in some embodiments, the scan driver 420 may be integrated or formed in the display panel 410. In other embodiments, the scan driver 420 may be implemented with one or more integrated circuits.

The emission driver 430 may sequentially provide the emission signals EM[n] to the plurality of pixels PX on a row-by-row basis based on an emission control signal EMCTRL received from the controller 460. In some embodiments, the emission control signal EMCTRL may include, but is not limited to, an emission start signal and an emission clock signal. Further, in some embodiments, the emission driver 430 may be integrated or formed in the display panel 410. In other embodiments, the emission driver 430 may be implemented with one or more integrated circuits.

The sweep driver 440 may sequentially provide the sweep voltages VSWEEP[n] to the plurality of pixels PX on a row-by-row basis based on a sweep control signal SWPCTRL received from the controller 460. In some embodiments, the sweep voltage VSWEEP[n] may gradually increase in a sweep period. Further, in some embodiments, the sweep driver 440 may be integrated or formed in the display panel 410. In other embodiments, the sweep driver 440 may be implemented with one or more integrated circuits.

The data driver 450 may receive a data control signal DCTRL and output image data ODAT from the controller 460, may provide the PWM data voltages DV_PWM to the plurality of pixels PX based on the output image data ODAT, and may provide substantially the same CCG data voltage DV_CCG to the plurality of pixels PX. In some embodiments, a voltage level of the PWM data voltage DV_PWM for each pixel PX may be determined according to a gray level indicated by the output image data ODAT for the pixel PX. Further, in some embodiments, the data driver 450 may provide substantially the same CCG data voltage DV_CCG to the plurality of pixels PX. In some embodiments, the data control signal DCTRL may include, but is not limited to, an output data enable signal, a horizontal start signal, and a load signal. Further, in some embodiments, the data driver 450 and the controller 460 may be implemented as a single integrated circuit, and the single integrated circuit may be also referred to as a timing controller embedded data driver ("TED") integrated circuit. In other embodiments, the data driver 450 and the controller 460 may be implemented as separate integrated circuits.

The controller 460 (e.g., a timing controller) may receive input image data IDAT and a control signal CTRL from an external host processor (e.g., a graphics processing unit ("GPU"), an application processor ("AP") or a graphics card). In some embodiments, the control signal CTRL may include, but is not limited to, a vertical synchronization signal, a horizontal synchronization signal, an input data enable signal, a master clock signal, or the like. The controller 460 may generate the output image data ODAT, the data control signal DCTRL, the scan control signal SCTRL, the emission control signal EMCTRL and the sweep control signal SWPCTRL based on the input image data IDAT and the control signal CTRL. The controller 460 may control the data driver 450 by providing the output image data ODAT and the data control signal DCTRL to the data driver 450, may control the scan driver 420 by providing the scan control signal SCTRL to the scan driver 420, may control the emission driver 430 by providing the emission control signal EMCTRL to the emission driver 430, and may control the sweep driver 440 by providing the sweep control signal SWPCTRL to the sweep driver 440.

Figure 12:
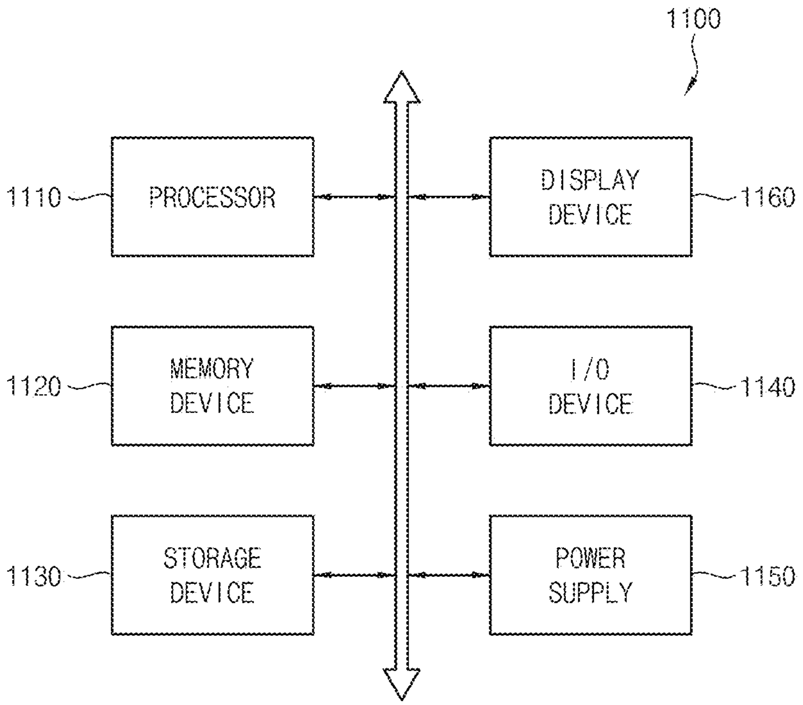
FIG. 12 is a block diagram illustrating an embodiment of an electronic device including a display device.

FIG. 12 is a block diagram illustrating an embodiment of an electronic device including a display device.

Referring to FIG. 12, an electronic device 1100 may include a processor 1110, a memory device 1120, a storage device 1130, an input/output ("I/O") device 1140, a power supply 1150 and a display device 1160. The electronic device 1100 may further include a plurality of ports for communicating with a video card, a sound card, a memory card, a universal serial bus ("USB") device, other electric devices, etc.

The processor 1110 may perform various computing functions or tasks. The processor 1110 may be an application processor ("AP"), a micro-processor, a central processing unit ("CPU"), etc. The processor 1110 may be coupled to other components via an address bus, a control bus, a data bus, etc. Further, in some embodiments, the processor 1110 may be further coupled to an extended bus such as a peripheral component interconnection ("PCI") bus.

The memory device 1120 may store data for operations of the electronic device 1100. In an embodiment, the memory device 1120 may include at least one non-volatile memory device such as an erasable programmable read-only memory ("EPROM") device, an electrically erasable programmable read-only memory ("EEPROM") device, a flash memory device, a phase change random access memory ("PRAM") device, a resistance random access memory ("RRAM") device, a nano floating gate memory ("NFGM") device, a polymer random access memory ("PoRAM") device, a magnetic random access memory ("MRAM") device, a ferroelectric random access memory ("FRAM") device, etc., and/or at least one volatile memory device such as a dynamic random access memory ("DRAM") device, a static random access memory ("SRAM") device, a mobile dynamic random access memory ("mobile DRAM") device, etc., for example.

The storage device 1130 may be a solid state drive ("SSD") device, a hard disk drive ("HDD") device, a compact disc-read only memory ("CD-ROM") device, etc. The I/O device 1140 may be an input device such as a keyboard, a keypad, a mouse, a touch screen, etc., and an output device such as a printer, a speaker, etc. The power supply 1150 may supply power for operations of the electronic device 1100. The display device 1160 may be coupled to other components through the buses or other communication links.

In each pixel of the display device 1160, a PWM driving transistor may receive a sweep voltage at a terminal (e.g., a source) of the PWM driving transistor. Thus, during a sweep period in which the sweep voltage is gradually changed, a voltage of a gate of the PWM driving transistor may be substantially constant. Accordingly, when a CCG driving transistor generates an emission current, a voltage of a gate of the CCG driving transistor may not be distorted by the sweep voltage, and the emission current may have a desired target current level. Further, in each pixel of the display device 1160, a CCG circuit may include first and second capacitors connected to the gate of the CCG driving transistor, and a PWM signal may be transferred to the gate of the CCG driving transistor by coupling of the second capacitor. Thus, while the CCG driving transistor changes from a turn-on state to a turn-off state, or during a falling time duration in which the emission current decreases, a voltage stored in the second capacitor, or the voltage in which a threshold voltage of the CCG driving transistor is reflected may be substantially maintained. Accordingly, even while the emission current decreases, a threshold voltage deviation between the CCG driving transistors of a plurality of pixels may be compensated, and an image quality of the display device 1160 may be improved.

The inventive concepts may be applied any electronic device 1100 including the display device 1160. In an embodiment, the inventive concepts may be applied to a mobile phone, a smart phone, a virtual reality ("VR") device, a television ("TV") (e.g., a digital TV, a three-dimensional ("3D") TV, etc.), a wearable electronic device, a personal computer ("PC") (e.g. a laptop computer, a tablet computer, etc.), a home appliance, a personal digital assistant ("PDA"), a portable multimedia player ("PMP"), a digital camera, a music player, a portable game console, a navigation device, etc., for example.

The foregoing is illustrative of embodiments and is not to be construed as limiting thereof. Although a few embodiments have been described, those skilled in the art will readily appreciate that many modifications are possible in the embodiments without materially departing from the novel teachings and advantages of the inventive concept. Accordingly, all such modifications are intended to be included within the scope of the inventive concept as defined in the claims. Therefore, it is to be understood that the foregoing is illustrative of various embodiments and is not to be construed as limited to the illustrative embodiments disclosed, and that modifications to the disclosed embodiments, as well as other embodiments, are intended to be included within the scope of the appended claims.

What is claimed is:

1. A pixel of a display device, the pixel comprising:
- a pulse width modulation ("PWM") circuit configured to generate a PWM signal based on a PWM data voltage and a sweep voltage;
- a constant current generation ("CCG") circuit configured to generate an emission current based on a CCG data voltage and the PWM signal, the CCG circuit including:
  - a CCG driving transistor configured to generate the emission current;
  - a first capacitor including:
    - a first electrode which receives a first CCG power supply voltage having a relatively high power voltage level; and
    - a second electrode connected to a gate of the CCG driving transistor; and
  - a second capacitor including:
    - a first electrode connected to the gate of the CCG driving transistor; and
    - a second electrode which receives the PWM signal generated by the PWM circuit; and
- a light-emitting element configured to emit light based on the emission current.

2. The pixel of claim 1, wherein the sweep voltage gradually increases in a sweep period,
- wherein the PWM circuit applies the sweep voltage as the PWM signal to the CCG circuit when the sweep voltage is higher than the PWM data voltage, and
- wherein the CCG circuit starts generating the emission current at a start point of the sweep period, and stops generating the emission current in response to the sweep voltage.

3. The pixel of claim 2, wherein the sweep voltage applied to the CCG circuit is transferred to the gate of the CCG driving transistor by coupling of the second capacitor.

4. The pixel of claim 1, wherein the CCG driving transistor includes the gate connected to the second electrode of the first capacitor and the first electrode of the second capacitor, a first terminal which receives the first CCG power supply voltage, and a second terminal connected to the light-emitting element.

5. The pixel of claim 4, wherein the CCG circuit further includes:
- a first transistor configured to apply a reset voltage to the gate of the CCG driving transistor in response to a first scan signal;
- a second transistor configured to diode-connect the CCG driving transistor in response to a second scan signal; and
- a third transistor configured to apply the CCG data voltage to the second electrode of the second capacitor in response to a third scan signal.

6. The pixel of claim 5, wherein the third scan signal is a write signal for an N-th pixel row in which the pixel is arranged, where N is an integer greater than or equal to 1, wherein the second scan signal is a write signal for an (N−1)-th pixel row, and wherein the first scan signal is a write signal for an (N−2)-th pixel row.

7. The pixel of claim 5, wherein the first transistor includes a gate which receives the first scan signal, a first terminal which receives the reset voltage, and a second terminal connected to the gate of the CCG driving transistor, the second electrode of the first capacitor and the first electrode of the second capacitor, wherein the second transistor includes a gate which receives the second scan signal, a first terminal connected to the second terminal of the CCG driving transistor, and a second terminal connected to the gate of the CCG driving transistor, the second electrode of the first capacitor and the first electrode of the second capacitor, and wherein the third transistor includes a gate which receives the third scan signal, a first terminal which receives the CCG data voltage, and a second terminal connected to the second electrode of the second capacitor.

8. The pixel of claim 5, wherein the CCG circuit further includes:

a fourth transistor configured to provide the emission current generated by the CCG driving transistor to the light-emitting element in response to an emission signal;

a fifth transistor configured to apply a reference voltage to the second electrode of the second capacitor in response to a fourth scan signal; and a sixth transistor configured to initialize the light-emitting element in response to the first scan signal.

9. The pixel of claim 8, wherein the fourth transistor includes a gate which receives the emission signal, a first terminal connected to the second terminal of the CCG driving transistor, and a second terminal connected to the light-emitting element, wherein the fifth transistor includes a gate which receives the fourth scan signal, a first terminal connected to the second electrode of the second capacitor, and a second terminal which receives the reference voltage, and wherein the sixth transistor includes a gate which receives the first scan signal, a first terminal connected to an anode of the light-emitting element, and a second terminal which receives a second CCG power supply voltage having a relatively low power voltage level.

10. The pixel of claim 1, wherein the PWM circuit includes:

a third capacitor including a first electrode which receives a PWM power supply voltage, and a second electrode; and a PWM driving transistor including a gate connected to the second electrode of the third capacitor, a first terminal which receives the sweep voltage, and a second terminal which outputs the PWM signal.

11. The pixel of claim 10, wherein the PWM circuit further includes:

a seventh transistor configured to apply the sweep voltage to the first terminal of the PWM driving transistor in response to an emission signal;

an eighth transistor configured to apply the PWM data voltage to the first terminal of the PWM driving transistor in response to a second scan signal;

a ninth transistor configured to diode-connect the PWM driving transistor in response to the second scan signal;

a tenth transistor configured to apply the PWM signal generated by the PWM driving transistor to the CCG circuit in response to a fourth scan signal; and an eleventh transistor configured to apply a reset voltage to the second electrode of the third capacitor in response to a first scan signal.

12. The pixel of claim 1, wherein a frame period for the pixel includes:

an initialization period in which the first capacitor, the second capacitor, and a third capacitor included in the PWM circuit are initialized;

a compensation period in which the PWM data voltage is provided to the PWM circuit, a threshold voltage of a PWM driving transistor included in the PWM circuit is compensated, and a threshold voltage of the CCG driving transistor is compensated;

a writing period in which the CCG data voltage is provided to the CCG circuit; and a sweep period in which the sweep voltage gradually increases.

13. The pixel of claim 12, wherein the sweep period includes:

an emission period in which the sweep voltage is lower than the PWM data voltage, and the light-emitting element emits light; and a non-emission period in which the sweep voltage is higher than the PWM data voltage, and the light-emitting element does not emit light.

14. A display device comprising:

a display panel including a plurality of pixels, each of the plurality of pixels including:

a PWM circuit configured to generate a PWM signal based on a PWM data voltage and a sweep voltage;

a CCG circuit configured to generate an emission current based on the CCG data voltage and the PWM signal, the CCG circuit including:

a CCG driving transistor configured to generate the emission current;

a first capacitor including a first electrode which receives a first CCG power supply voltage having a relatively high power voltage level, and a second electrode connected to a gate of the CCG driving transistor; and a second capacitor including a first electrode connected to the gate of the CCG driving transistor, and a second electrode which receives the PWM signal generated by the PWM circuit; and a light-emitting element configured to emit light based on the emission current;

a scan driver configured to provide scan signals to each of the plurality of pixels;

an emission driver configured to provide an emission signal to each of the plurality of pixels;

a sweep driver configured to provide a sweep voltage to each of the plurality of pixels;

a data driver configured to provide the PWM data voltage and a CCG data voltage to each of the plurality of pixels; and a controller configured to control the scan driver, the emission driver, the sweep driver and the data driver.

15. An electronic device comprising:

a processor configured to provide input image data; and a display device configured to receive the input image data from the processor, and to display an image based on the input image data, the display device including:

a display panel including a plurality of pixels, each of the plurality of pixels including:

a PWM circuit configured to generate a PWM signal based on a PWM data voltage and the sweep voltage;

a CCG circuit configured to generate an emission current based on the CCG data voltage and the PWM signal, the CCG circuit including:

a CCG driving transistor configured to generate the emission current;

a first capacitor including a first electrode which receives a first CCG power supply voltage, and a second electrode connected to a gate of the CCG driving transistor; and a second capacitor including a first electrode connected to the gate of the CCG driving transistor, and a second electrode which receives the PWM signal generated by the PWM circuit; and a light-emitting element configured to emit light based on the emission current;

a scan driver configured to provide scan signals to each of the plurality of pixels;

an emission driver configured to provide an emission signal to each of the plurality of pixels;

a sweep driver configured to provide a sweep voltage to each of the plurality of pixels;

a data driver configured to provide the PWM data voltage and a CCG data voltage to each of the plurality of pixels; and a controller configured to control the scan driver, the emission driver, the sweep driver and the data driver.

16. The electronic device of claim 15, wherein the sweep voltage gradually increases in a sweep period, wherein the PWM circuit applies the sweep voltage as the PWM signal to the CCG circuit when the sweep voltage is higher than the PWM data voltage, and wherein the CCG circuit starts generating the emission current at a start point of the sweep period, and stops generating the emission current in response to the sweep voltage.

17. The electronic device of claim 16, wherein the sweep voltage applied to the CCG circuit is transferred to the gate of the CCG driving transistor by coupling of the second capacitor.

18. The electronic device of claim 15, wherein the CCG driving transistor includes the gate connected to the second electrode of the first capacitor and the first electrode of the second capacitor, a first terminal which receives the first CCG power supply voltage, and a second terminal connected to the light-emitting element.

19. The electronic device of claim 18, wherein the CCG circuit further includes:

a first transistor configured to apply a reset voltage to the gate of the CCG driving transistor in response to a first scan signal;

a second transistor configured to diode-connect the CCG driving transistor in response to a second scan signal; and a third transistor configured to apply the CCG data voltage to the second electrode of the second capacitor in response to a third scan signal.

20. The electronic device of claim 19, wherein the third scan signal is a write signal for an N-th pixel row in which a pixel of the plurality of pixels is arranged, where N is an integer greater than or equal to 1, wherein the second scan signal is a write signal for an (N−1)-th pixel row, and wherein the first scan signal is a write signal for an (N−2)-th pixel row.

* * * * *